(12) United States Patent
Izumi et al.

(10) Patent No.: US 8,331,207 B2
(45) Date of Patent: Dec. 11, 2012

(54) OPTICAL PICKUP AND OPTICAL DISC UNIT

(75) Inventors: Katsuhiko Izumi, Kamakura (JP);
Kazuyoshi Yamazaki, Kawasaki (JP);
Tomoto Kawamura, Tokyo (JP);
Kunikazu Ohnishi, Yokosuka (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 781 days.

(21) Appl. No.: 12/074,968

(22) Filed: Mar. 7, 2008

(65) Prior Publication Data

US 2008/0219119 A1 Sep. 11, 2008

(30) Foreign Application Priority Data

Mar. 9, 2007 (JP) ................................. 2007-059379

(51) Int. Cl.
*G11B 7/00* (2006.01)
(52) U.S. Cl. ............. 369/44.41; 369/44.37; 369/112.05; 369/112.16
(58) Field of Classification Search ................ 369/44.23, 369/44.37, 44.41, 44.42, 112.03, 112.05, 369/112.16, 112.18, 112.21, 112.22, 110.02–110.04
See application file for complete search history.

(56) References Cited

U.S. PATENT DOCUMENTS

| | | | | |
|---|---|---|---|---|
| 5,315,574 A * | 5/1994 | Saimi et al. | ............... | 369/112.03 |
| 5,455,712 A | 10/1995 | Yamamoto et al. | | |
| 5,493,555 A * | 2/1996 | Kimura et al. | ............ | 369/110.03 |
| 6,104,689 A * | 8/2000 | Noguchi | ..................... | 369/44.23 |
| 6,278,548 B1 * | 8/2001 | Shimano et al. | ............... | 359/565 |
| 6,418,098 B1 * | 7/2002 | Yamamoto et al. | ......... | 369/44.41 |
| 7,227,819 B2 * | 6/2007 | Kadowaki et al. | ......... | 369/44.41 |
| 2004/0062158 A1 * | 4/2004 | Arai et al. | ................... | 369/44.32 |
| 2004/0109484 A1 | 6/2004 | Shinohara et al. | | |
| 2006/0077550 A1 | 4/2006 | Sano et al. | | |
| 2006/0164951 A1 * | 7/2006 | Yamasaki et al. | ........ | 369/112.01 |
| 2007/0104048 A1 | 5/2007 | Buchler et al. | | |
| 2007/0171778 A1 * | 7/2007 | Saito et al. | ................. | 369/44.23 |

FOREIGN PATENT DOCUMENTS

| | | |
|---|---|---|
| CN | 1495977 A | 12/2004 |
| JP | 06-027322 A | 2/1994 |
| JP | 10-269587 | 10/1998 |
| JP | 2006-054006 | 2/2006 |

OTHER PUBLICATIONS

China State Intellectual Property Office (SIPO) office action for SIPO patent application 2008100829071 (Jan. 22, 2010).
China State Intellectual Property Office (SIPO) office action for SIPO patent application 200810082907.1 (Jul. 30, 2010).
Japan Patent Office (JPO) office action for JPO patent application JP2007-059379 (Nov. 22, 2010).

* cited by examiner

*Primary Examiner* — Thang Tran
(74) *Attorney, Agent, or Firm* — Kilpatrick Townsend & Stockton LLP

(57) ABSTRACT

For use with a multi-layer optical disc, an optical pickup can eliminate a problem of causing a focus error signal and a tracking error signal to fluctuate due to interference of a signal light beam with a return light beam from another recording surface of a multi-layer optical disc during reproduction with an optical pickup that produces a tracking error signal and a focus error signal from a difference signal based on polarized reflected light.

8 Claims, 17 Drawing Sheets

SIGNAL LIGHT SPOT

REFLECTION LIGHT SPOT
FROM ANOTHER LAYER

SIGNAL LIGHT SPOT

REFLECTION LIGHT SPOT FROM ANOTHER LAYER

SIGNAL LIGHT SPOT

REFLECTION LIGHT SPOT
FROM ANOTHER LAYER

DIAMETRICAL DIRECTION OF DISC OR TRAVEL DIRECTION OF LIGHT BEAM UPON LENS SHIFT

DIAMETRICAL DIRECTION OF DISC OR TRAVEL DIRECTION OF LIGHT BEAM UPON LENS SHIFT

SIGNAL LIGHT SPOT

REFLECTION LIGHT SPOT
FROM ANOTHER LAYER

OPTICAL PICKUP AND OPTICAL DISC UNIT

INCORPORATION BY REFERENCE

The present application claims priority from Japanese Patent Application JP-2007-059379 filed on Mar. 9, 2007, the content of which is hereby incorporated by reference into this application.

BACKGROUND OF THE INVENTION

The present invention relates to an optical pickup and an optical disc unit which reproduce data recorded on an optical disc.

As to the background of the invention, for example, JP-A-10-269587 discloses an optical disc unit which is small-sized and thin, which can easily prevent occurrence of stray light and which can detect signals in both push-pull process and three-beam process at the same time.

Further, as to another background of the invention, for example, JP-A-2006-54006 discloses a method which can prevent an S/N ratio of a reproduced signal from greatly lowering upon removal of an offset from a tracking error signal by a push-pull process.

Among optical discs, there is presented a two-layer disc having signal recording surfaces stacked in two layers. For example, as to DVDs, a DVD-R and a DVD-RW are two-layer discs which can have a recording capacity which is about 2 times as high as that of a single layer optical disc. Further, there is presented the so-called Blu-ray Disc (which will be hereinbelow referred to as "BD") which is used in a high density recording optical disc system and which is also a two-layer disc.

An optical pickup incorporated in an optical disc unit utilizes a reflected light beam from an optical disc, as a servo control signal in both focusing and tracking directions of an objective lens. Thus, should undesirable stray light be mingled in the reflected light beam to be used as a signal, a failure would be caused during detection of a signal.

An optical pickup which split an optical beam emitted from a laser source into three optical beams, that is, a 0-order light beam and ±1-order light beams, which then irradiates these light beams onto an optical disc, and which receives from reflected light beams by a detector, has raised such a problem that, in the case of reproduction of a two-layer disc, an unnecessary reflected light beam from one of layers would become a stray light component which becomes a disturbance component of a tracking error signal obtained from the other one of layers.

However, in the above-mentioned JP-A-10-269587, a diffraction zone is split for exclusion of the stray light component, so as to receive only a +1- or −1-order light beam. Thus, a diffracted beam has a light quantity which is not greater than a half of that of an original light beam, that is, a detected signal becomes less. Further, since ±1-order light beams are produced from different split zones, the rate among the optical quantities of light beams which are diffracted at the split diffraction zones are likely to be uneven, the positions of optical spots of the ±1-order light beams can be hardly located in point symmetry with respect to a 0-order light beam, thereby it is difficult to obtain a satisfactory servo signal.

Further, the JP-A-2006-54006 proposes a tracking error signal detection system capable of restraining lowering of an S/N ratio of a reproduced signal. This document does not concern a problem of stray light caused by an optical disc having a plurality of recording layers, such as a two layer disc, that is, there is disclosed no measures for solving such a problem that the stray light becomes a component disturbing a tracking error signal.

BRIEF SUMMARY OF THE INVENTION

An object of the present invention is to provide an optical pickup and an optical disc unit which are highly reliable.

The above-mentioned object can be achieved by contriving an optical system for guiding a laser beam onto an optical detector or a light receiving surface of an optical detector and so forth.

To the end, according to the present invention, there is provided an optical pickup, which is capable of accepting a multi-layer optical disc, comprising a laser source for emitting an optical beam, an objective lens for focusing the light beam onto a multi-layer disc, a polarizing grating for splitting a reflected light beam from the multi-layer disc into at least two light beams, that is, a 0-order light beam and a +1-order light beam having a direction of polarization which is orthogonal to that of the 0-order light beam, an optical beams adapted to receive the at least two light beams and first and second light receiving zones which incorporated in the optical detector, the 0-order light beam being irradiated onto the first light receiving zone and the +1-order light beam being irradiated onto the second light receiving zone. Further, the optical detector is capable of delivering two output signals, that is, a push-pull signal obtained from the first light receiving zone and a signal which can be obtained from the second light receiving zone by using a computation formula similar to that for the push-pull signal, and delivers signals capable of producing a tracking error signal from a difference signal between the two output signals.

According to the present invention, there can be provided an optical pickup and an optical disc unit which are highly reliable.

Other objects, features and advantages of the invention will become apparent from the following description of the embodiments of the invention taken into conjunction with the accompanying drawings.

DETAILED DESCRIPTION OF THE INVENTION

The present invention will be detailed in the forms of preferred embodiments 1 to 5 as specific configurations for implementing the present invention. It is noted that a configuration in suitable combination of the above-mentioned embodiments may also exhibit technical effects and advantages similar to those exhibited by the embodiments 1 to 5.

Embodiment 1

Explanation will be hereinbelow made of a configuration of an optical pickup in an embodiment 1 of the present invention with reference to the accompanying drawings.

Figure 1:
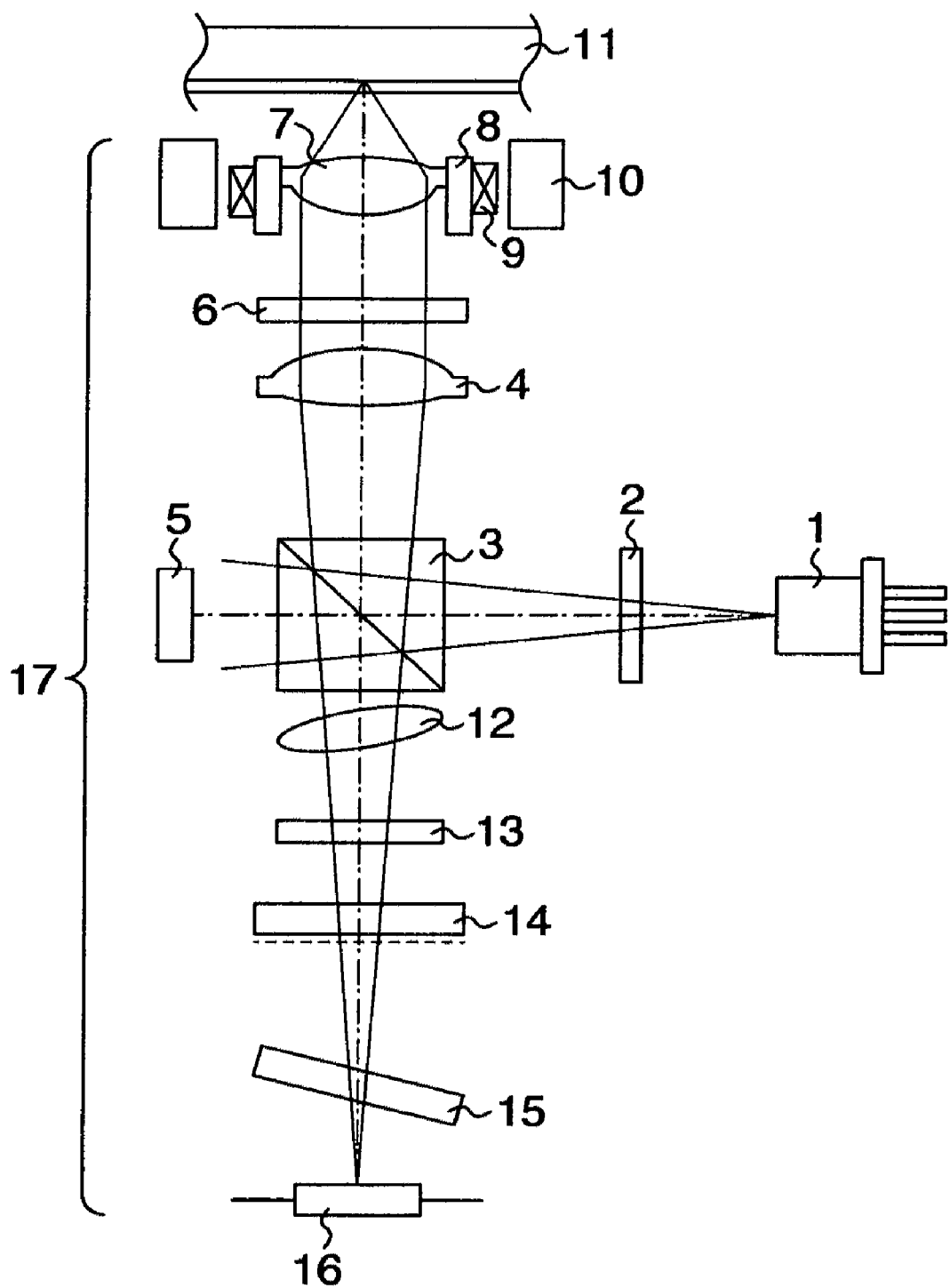
FIG. 1 is a view illustrating a configuration of an optical pickup in an embodiment 1 of the present invention.

Referring to FIG. 1 which is a view illustrating a configuration of a pickup in the embodiment 1 of the present invention, a semiconductor laser 1 which is capable of oscillation with a wavelength in a bandwidth of 405 nm, that is, the oscillating wavelength is 405 nm at a room temperature. It is noted that the bandwidth of 405 nm is the one with which a BD can be reproduced. FIG. 1 shows a condition in which an optical beam having a wavelength of 405 nm is emitted. The semiconductor 1 is arranged to be rotated around the optical axis of the light beam in order that the light beam emitted from the semiconductor laser 1 has a polarization (which will be referred to as "P-polarization") in parallel to the sheet surface of the figure. The light beam is incident upon a half-wave plate which is located just before the semiconductor laser 1 and which is adapted to add a phase difference corresponding to a one half of the wavelength of the light beam emitted from the semiconductor laser 1, to an incident polarized light beam in a particular direction, that is, in this embodiment, the P-polarized light beam is turned by about 85 deg., and accordingly, substantially every light beam is converted into a linearly polarized beam (which will be referred to as "S-polarization") having a direction of polarization perpendicular to the sheet of the figure.

The light beam outgoing from the half-wave plate is incident upon a PBS prism 3 which is formed in a parallelepiped shape, having therein a membrane surface which makes an angle of 45 deg., with respect to the optical axis of the outgoing light beam emitted from the semiconductor laser 1. Thus, the PBS prism 3 is an optical component which reflects the S-polarized component of the light beam having a wavelength in a 405 nm bandwidth substantially by 100%, and reflects the P-polarized component thereof, substantially by about 0%. The substantial part of the light beam which is incident upon the PBS prism 3 is S-polarized, and accordingly, the light beam is reflected in a direction making an angle of 90 deg., with respect to the incident direction, but a P-polarized component which is a part of the light beam is transmitted through the PBS prism 3, and comes into a front monitor 5 for monitoring a light quantity of the light beam.

The light beam reflected upon the reflection film in the PBS prism 3 is converted into a parallel ray beam by a collimator lens 4. The light beam coming out from the collimator lens 4 is then transmitted through a quarter-wave plate 6 by which it is converted into a circularly polarized light, and is thereafter incident upon an objective lens 7 having a function capable of focusing a light beam in a 405 nm band, which is incident thereupon, onto a first data recording surface of an optical disc 11 having a substrate thickness of 0.1 mm, such as a BD.

The objective lens 7 is held by an actuator 8 integrally incorporated with a drive coil 9 which is opposed to a magnet 10. The drive coil 9 produces, when energized, a drive force caused by a reaction force from the magnet 10, and accordingly, it can displace the objective lens 7 in directions which are substantially parallel with and perpendicular to the optical disc 11, respectively. It is noted here that a light quantity of the light beam transmitted through the objective lens 7 or a light quantity of a beam spot focused on the light disc 11 can be estimated, being based upon a light quantity detected by the front monitor 5.

The light beam reflected from the optical disc 11 is led through a return path which is the same as its outgoing path in a direction reverse to its outgoing direction, then is led to the quarter wave plate 6 by way of the objective lens 7. At that time, the polarization of a substantial part of the light beam is a circular polarization the same as that on the outgoing optical path, and accordingly, when it has been led through the quarter wave plate 6, it is converted into a P-polarized light beam, orthogonal to that on the outgoing path. Thereafter, the light beam is incident upon the collimator lens 4 by which it is converted into a converged light beam from a parallel ray beam, and then comes onto the PBS prism 3. The light beam which is incident upon the PBS prism and which has a P-polarized component can be transmitted through the membrane surface of the PBS prism 3 by 100%.

On the downstream side of the PBS prism 3, there are arranged, on a straight line, a detection lens 12, a half wave plate 13, a polarizing grating 14 and a planar plate 15. The detection lens 12 is adapted for enlarging a synthesized focal distance on the detection system side and for cancelling unnecessary coma aberration occurring at the planar plate 15 which is arranged further downstream thereof, for producing astigmatic aberration. The half wave plate 13 is so arranged as to set its azimuth angle with which the direction of polarization of the light beam is turned by angle of 24 deg., around the optical axis thereof, as will be hereinbelow detailed. The polarizing grating 14 is adapted for splitting the light beam incident thereupon into three beams, that is, a 0-order light beam and ±1-order light beams which are irradiated onto an optical detection surface of the optical detector 16 as will be detailed later. The light beam transmitted through the polarizing grating 14 has been turned into a converged light beam after being transmitted through the collimator lens 4, and is transmitted through the planar plate 15 inclined with respect the advancing direction of the light beam so as to be subjected to astigmatic aberration. Thereafter, the light beam is converged at a predetermined optical detection surface in the optical detector 16 which is capable of delivering a servo signal and a reproduction signal from the received light beam that has been reflected from the optical disc 11.

As stated above, the optical pick is composed of the optical components and electric components in combination.

Figure 2:
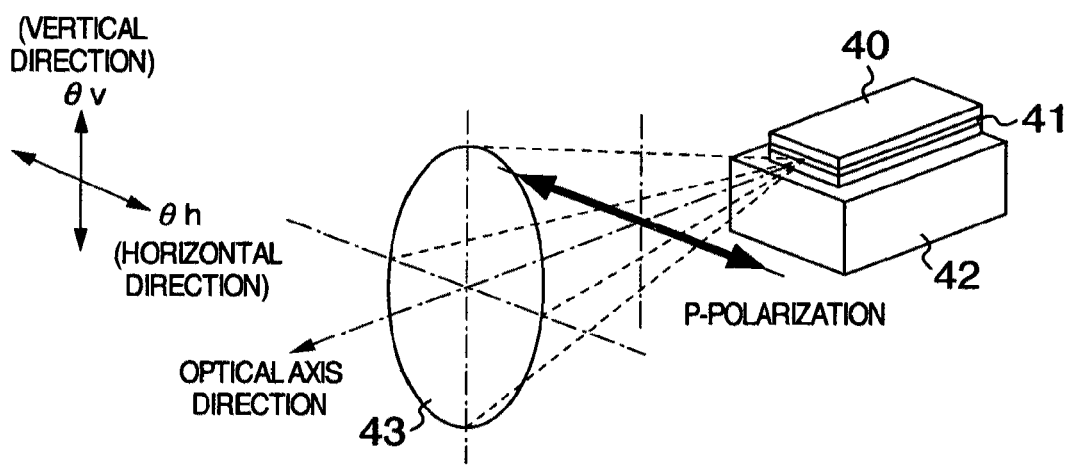
FIG. 2 is a view illustrating a laser chip mounted on a semiconductor laser in relation to polarization of a laser beam.

Next, explanation will be hereinbelow made of a laser chip mounted on the semiconductor laser and the polarization with reference to FIG. 2. Referring to FIG. 2, the laser chip 40 adapted to emit a light beam having a 405 nm band is mounted on the substrate 42, and incorporated in the semiconductor laser 1 shown in FIG. 1. The laser chip 40 is formed therein with an active layer 41 which emits a light beam from its one end surface. The light beam having a 405 nm band and emitted from the one end surface substantially in parallel with the longitudinal direction of the laser chip 41 has a small diverging angle with respect to the optical axis of the light beam in a direction θh (horizontal direction) parallel with the active layer 41, but a large diverging angle in a direction θv (vertical direction) perpendicular to the active player 41. For example, these diverging angles are 9 deg. and 18 deg. respectively, and the diversion 43 of the light beam has an elliptic intensity distribution which is longer in the θv direction. It is noted that the oscillation plane of the light beam emitted from the laser chip 40 is substantially coincident with a plane parallel with the active layer 41, that is, the θh direction, and accordingly, it has the so-called P-polarized state in which the light beam oscillates in a direction indicated by the arrow.

Figure 3:
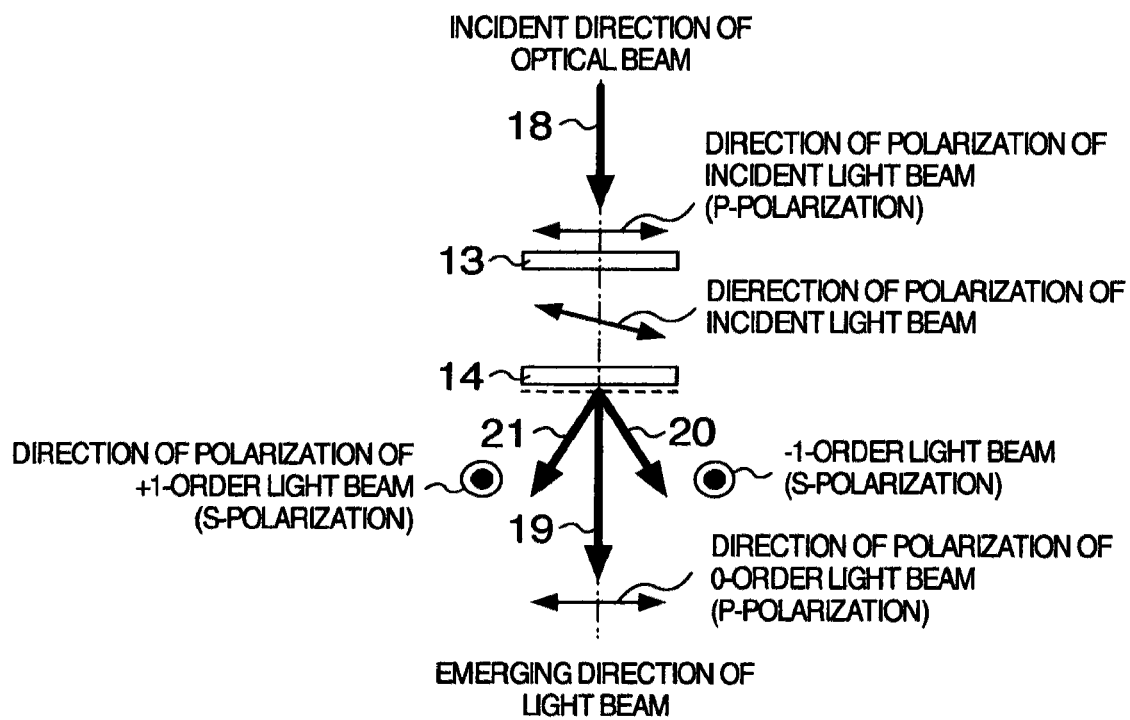
FIG. 3 is a view for explaining a diffracted condition of a light beam in a polarized grating.

FIG. 3 is a view which shows a diffraction of the light beam in the polarizing grating, and which shows in particular the part around the half wave plate 13 and the polarizing grating 14 shown in FIG. 1. In FIG. 3, a light beam returned from an optical disc 11 which is not shown in this figure, travels forward in a direction as indicated by the arrow 18 shown in the figure, that is, it is a light beam incident upon the half wave plate 13. The polarized direction of the incident beam upon the half wave plate 13 is in parallel with the sheet surface of the figure (P-polarized beam). It is noted here that the azimuth of the half wave plate 13 is inclined at an angle of 12 deg., around the optical axis, and accordingly, the polarized direction of the optical beam transmitted through the half wave plate 13 is inclined at α=24 deg., as shown in the figure, that is, it becomes a linearly polarized light beam, and accordingly, it has a polarized state having not only a P-polarized component and but also an S-polarized component before it is incident upon the polarizing grating 14. The polarizing grating 14 is adapted to diffract a light beam which is the S-polarized component inherent to the grating, so as to produce ±1-order light beams, and accordingly, the light quantity corresponding to the square of cos α is diffracted, branching into the +1 order light beam and the −1-order light beam. At this time, the ±1-order light beams 20, 21 become P-polarized light beams having an oscillation plane which is in parallel with the sheet surface of the figure, as indicated by the round marks shown in the figure. Meanwhile, in the light beam incident upon the polarizing grating 14, the light quantity corresponding to the square of sin α completely passes through the polarizing grating 14 as a 0-order light beam. At this time, the 0-order light beam becomes a P-polarized light beam having an oscillation plate parallel with the sheet surface of the figure, as indicted by the arrow. That is, the light beam 19 branches into the 0-order light beam 19 having the P-polarized components and the ±1-order light beams 21, 22 having the S-polarized components after it is transmitted through the polarizing grating 14.

Figure 4:
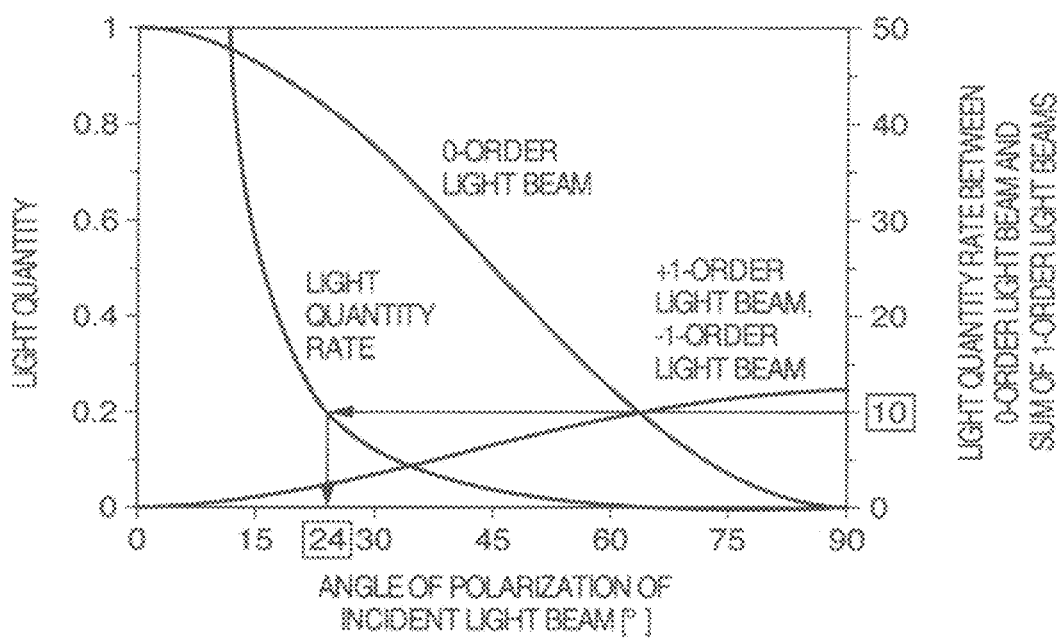
FIG. 4 is a view for explaining a relationship between an incident polarizing angle and light quantities of a 0-order light beam and ±1-order light beams with respect to a polarized grating.

Next, explanation will be made of the relationships between the polarization angle of the light beam incident upon the polarizing grating 14, and the quantities of the 0-order light beam as well ±1-order light beams. FIG. 4 shows relationships between the polarization angle of the light beam incident upon the polarizing grating and the light quantities of the 0-order light beam and ±1-order light beams. It is noted here that the polarizing grating 14 in the embodiment 1 is adapted to diffract only the S-polarized component into +1-order and −1-order light beams each having a light quantity which is 50% of that of the S-polarized component. Thus, the P-polarized light beam having an incident polarization angle of 0 deg., is transmitted as it is, without all light quantity is not diffracted, and accordingly, the light quantity of the 0-order light beam becomes 1 while the light quantities of the +1-order and −1-order light beams become zero. Since the S-polarized components to be diffracted becomes greater as the incident angle of the incident polarized beam is relatively increased from zero deg., the 0-order light beam is decreased while the +1-order and −1-order light beams are increased. It is noted here that the +1-order and −1-order light beams exhibit one and the same behavior. The rate of light quantities of the 0-order light beam and the ±1-order light beams is desirably set so that the rate between the 0-order light beam and the sum of the ±1-order light beams is about 10:1 in view of such a desire that the 0-order light beam adapted to be used for detecting a reproduction signal is as large as possible. In order to set the light quantity of the 0-order light beam to, for example, ten times as large as that of the ±1-order light beams, it may be said that the incident polarization angle to the polarizing grating 14 may be set to 24 deg.

Figure 5:
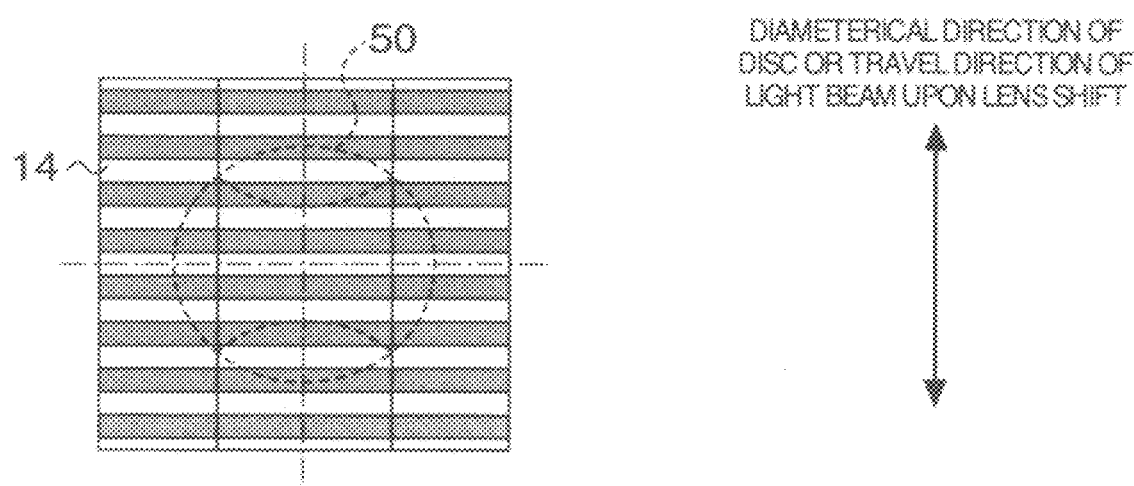
FIG. 5 is a view illustrating a pattern of a polarizing grating.

Next, explanation will be made of a pattern of the polarizing grating in the embodiment 1 with reference to FIG. 5 which is a view illustrating the pattern of the polarizing grating 14. The polarizing grating 14 is formed in its front surface with grating grooves of a polarization dependable type which diffract an S-polarized light beam by about 100% but transmit therethrough a P-polarized light beam by about 100%. The polarizing grating 14 is arranged so that the direction of a diffraction pattern (a ball shape image) of a light beam 50 obtained from a groove structure of an optical disc, that is, the radial direction of a disc, as indicated by a broken line in the figure is coincident with a direction perpendicular to the grating grooves, that is, the vertical direction in the figure.

Figure 6:
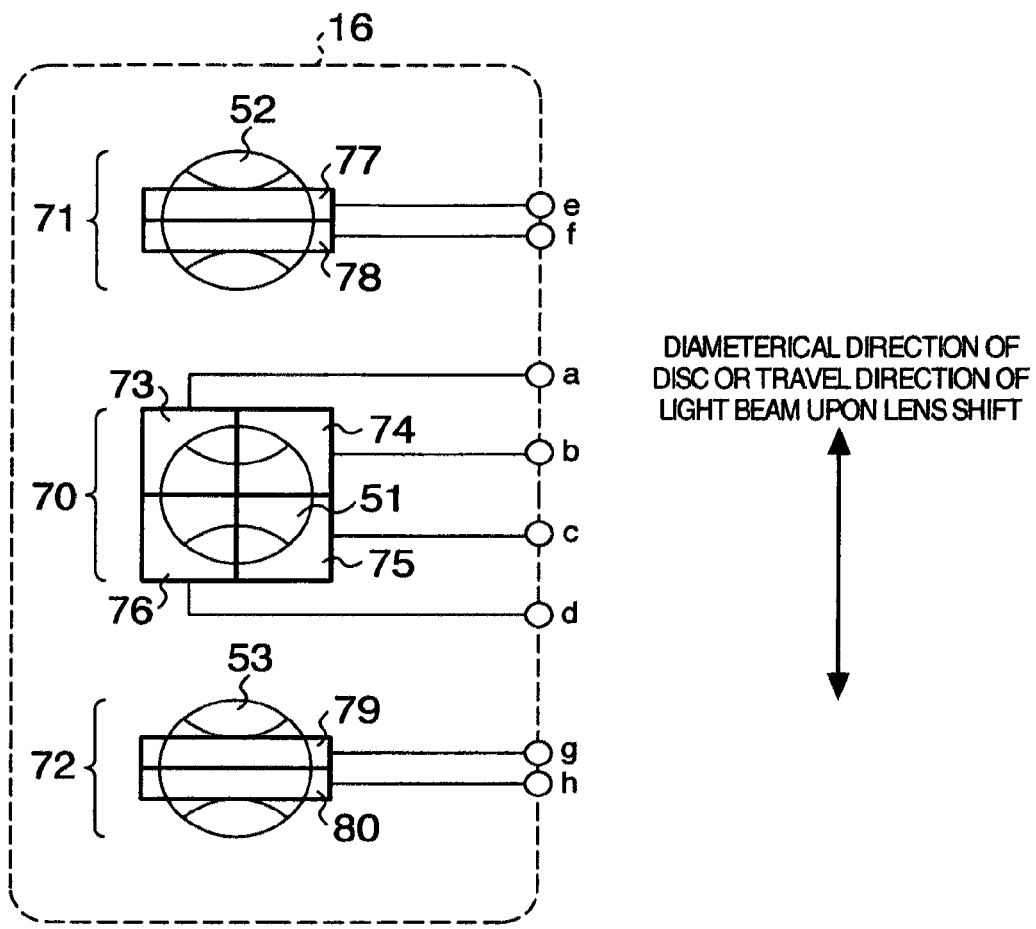
FIG. 6 is a view illustrating a pattern of a light receiving surface of an optical detector.

Next, explanation will be made of the light receiving surface of the optical detector. FIG. 6 shows the light receiving pattern of the optical detector 16 on which three light receiving zones 70, 71, 72 are formed, the light receiving zone 71 and the light receiving zone 72 being arranged, symmetric with each other about the light receiving zone 70 as a center. The light receiving zone 70 is split into four light receiving surfaces 72, 74, 75, 76 arranged in a cross-grid shape. Outputs from the light receiving surfaces 73, 74, 75, 76 are delivered respectively from terminals a, b, c, d. The light receiving zone 71 is composed of two belt-like light receiving surfaces 77, 78 which vertically abut against each other. Outputs from the light receiving surfaces 77, 78 are delivered from terminals e, f respectively. The light receiving zone 72 is composed of two belt-like light receiving surfaces 79, 80 which abut to each other in the vertical direction. Outputs from the light receiving surfaces 79, 80 are delivered from terminals g, h, respectively.

In the embodiment 1, a 0-order ling beam 51 having been transmitted through the polarizing grating 14 as it is, is irradiated on the light receiving zone 70 in the optical detector 60 in the vicinity of the center thereof, a +1-order light beam having been diffracted by the polarizing grating 14 is irradiated onto the light receiving zone 71 in the vicinity of the center thereof while a −1-order light beam 53 is irradiated onto the light receiving zone 72 in the vicinity of the center thereof. Further, in the embodiment 1, the light beams are subjected to astigmatic aberration due to the action of the planar plate 15 shown in FIG. 1, that is, a focus error signal is detected by the so-called astigmatic detection process. Accordingly, the light beams 51, 52, 53 irradiate spots having a diameter of about 50 μm, on the detection surfaces. Further, the optical components of the optical pickup 17 are set so as to cause the direction of the diffraction pattern existing in each of the light beams, that is, the radial direction of the disc is coincident with the direction of diffraction of the +1-order light beam 52 and −1-order light beam 53. In the light receiving zones 71, 72, the vertical widths of the light receiving surfaces 77, 78, 79, 80 are set so as to detect signals from parts in the vicinity of the center of the light beam where no diffraction pattern is produced in either of the +1-order light beam 52 and the −1-order light beam 53.

Figure 7:
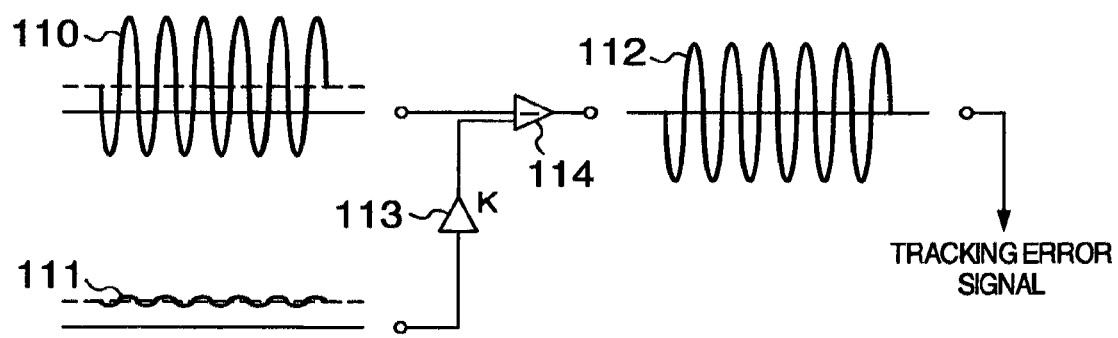
FIG. 7 is a view for explaining a method of producing a tracking error signal.

Explanation will be hereinbelow made of a method of producing a focus error signal and a tracking error signal in the embodiment 1 with reference to FIGS. 6 and 7. The focus error signal can be obtained from an output signal which can be delivered from the light receiving zone 70 that receives the 0-order light beam 51, being based upon the so-called astigmatic detection process for computing the following formula:

Focus Error Signal=$(a+c)-(b+d)$.

It is noted that the principle of the astigmatic detection process has been well-known, and accordingly, the explanation thereto will be omitted.

Meanwhile, the tracking error signal is obtained from output signals respectively obtained from the 0-order light beam 51, the +1-order light beam 52 and the −1-order light beam 53 by computing the following formula similar to the so-called differential push-pull (DPP) process:

Tracking Error Signal=$((a+b)-(c+d))-k*((e-f)+(g-h))$

It is noted that the principle of the DDP process has been well-known, and accordingly, the explanation thereto will be omitted. Incidentally, the anterior term in the above-mentioned formula, $(a+b)-(c+d)$ corresponds to such a part as to produce a part from which the so-called push-pull signal such as a waveform 110 is produced from the 0-order light beam 51. The waveform 110 is assumed so that the objective lens 7 is shifted in the radial direction of the disc, and accordingly, the push-pull signal is added thereto with a certain value of DC offset. The first ten in the posterior term in the formula, $(e-f)$ is adapted to produce an offset signal proportional to a radial shift of the objective lens 7 by detecting a displacement of the position of the spot of the +1-order light beam caused by a radial shift of the objective lens 7 and a variation in light quantity of the distribution thereof. Further, similarly, the second term in the posterior term, $(g-h)$, is obtained by detecting a displacement of the position of the spot of the −1-order light beam 53 and a variation in light quantity of distribution thereof. An offset signal adapted to produce an offset signal proportional to a radial shift of the objective lens 7 from the posterior term $(e-f)+(g-h)$ is detected from the parts of the +1-order light beam 52 and the −1-order light beam 53, in which no diffraction patterns are produced, and accordingly, substantially no push-pull signal components are contained, such as a waveform 111, so that it is added thereto with a DC offset. The subtraction between the waveform 110 and the value obtained by adding a k-multiplied gain 113 to the waveform 111 is carried out by a subtractor 114, and accordingly, a satisfactory push-pull waveform with no DC offset can be obtained as a tracking error signal, such a waveform 112. Thus, even in the case of occurrence of a radial shift of the objective lens 7, it is possible to prevent a DC offset from being produced in a tracking signal.

Figure 8:
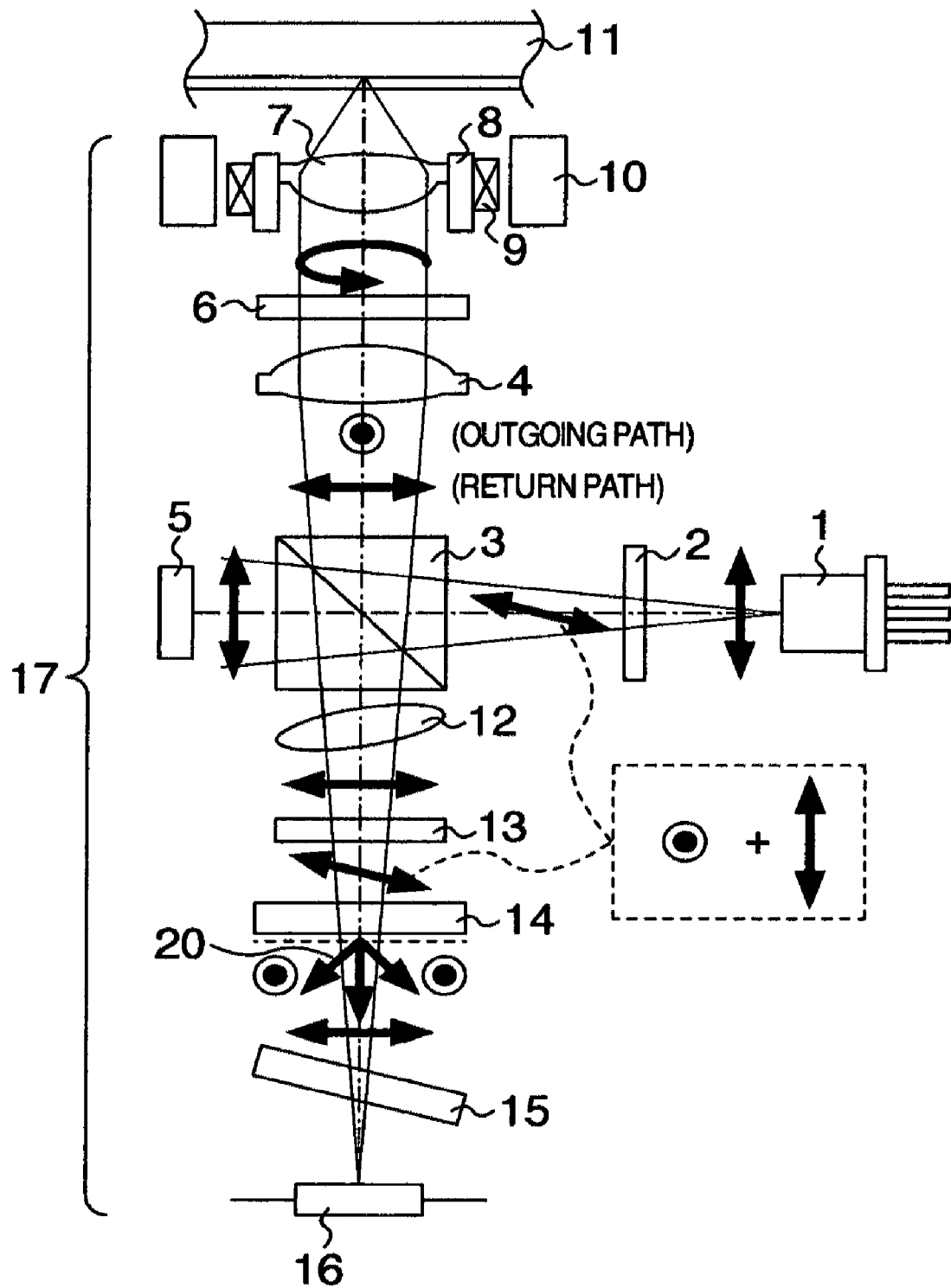
FIG. 8 is a view for explaining a polarized condition of an optical beam in an optical pickup.

Next, explanation will be made of a polarized state of the light beam in the optical pickup with reference to FIG. 8. It is noted that the components shown in FIG. 8 have been already explained hereinabove with reference to FIG. 1, and accordingly, the explanation thereto will be omitted. Referring to FIG. 8, the light beam emitted from the semiconductor laser 1 has a polarized direction parallel to the sheet surface of the figure, as indicated by the arrow therein (P-polarized light beam). When the light beam is transmitted through the half wave plate 2 located just before the semiconductor laser 1, the light beam is turned into a linearly polarized beam by about an angle of 85 deg. about the optical axis so as to substantially have a component having a polarized direction perpendicular to the sheet surface of the figure, as indicated by the round mark in the figure (S-polarized light beam) but also slightly has a P-polarized light beam. The light beam emerged from the half wave plate 2 is incident upon the PBS prism 3 so as to be reflected thereat in a direction making an angle of 90 deg., with respect to the incident direction since the light beam substantially has the S-polarized component. Meanwhile, the P-polarized component as a part of the light beam is transmitted through the PBS prism 3, and is then incident upon the front monitor 5.

The light beam reflected on the reflection membrane in the PBS prism 3 is transmitted through the collimating lens 4, being maintained in the S-polarized state as it is, and then is incident upon the quarter wave plate 6 which converts the light beam into a circularly polarized beam. Thereafter, the light beam is transmitted through the objective lens 7, and is then reflected upon the recording surface of the disc 11. Then, the light beam is returned to the quarter wave plate 6 with its circular polarized state being maintained, by way of the objective lens 7. When the light beam is transmitted through the quarter wave plate 6, it is converted into a light beam which is polarized in a direction orthogonal to that of the light beam incident upon the disc 11. That is, the light beam is turned into a P-polarized beam having a polarized direction parallel with the sheet surface of the figure as indicated by the arrow in the figure. Thereafter, the light beam is incident upon the PBS prism 3 by way of the collimating lens 4. Since the P-polarized light beam is transmitted through the PBS prism 3 by 100%, the light beam is still P-polarized when it is transmitted through the detection lens 12.

Since the half wave plate 13 is arranged to set its azimuth in such a way that the polarized direction of the light beam is turned by an angle of 24 deg., after the detection lens 12, the light beam having transmitted through the half wave plate 13 is turned, around its optical axis, into a linearly polarized beam having both P-polarized component and S-polarized component. The light beam emerged from the half-wave plate 13 is incident upon the polarizing grating 14 which transmits therethrough the P-polarized component in the form of a 0-order light beam but diffracts the S-polarized component in the form of ±1-order light beams as stated above. The 0-order light beam and the ±1-order light beams which are emerged from the polarizing grating 14 are transmitted through the planar plate 15 while their polarized stats are maintained at it is, and are then incident upon predetermined light receiving surfaces of the optical detector 16.

Figure 9B:
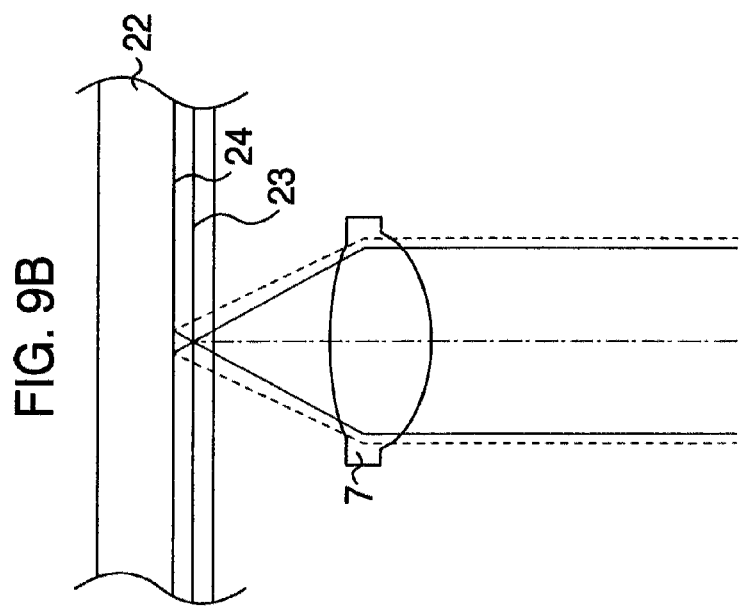
FIGS. 9A and B are views for explaining conditions of an optical beam in the case of reproducing a two layer disc.
Figure 9A:
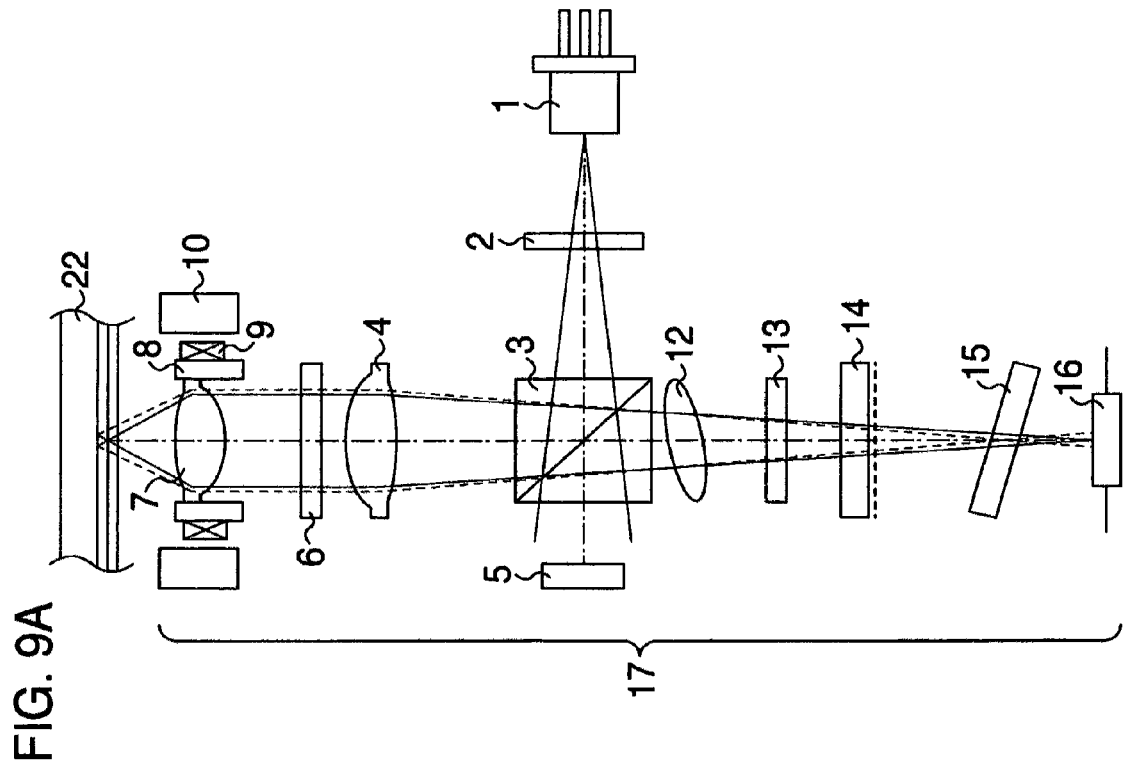

Next, explanation will be made of the condition of the light beam upon reproduction of a two layer disc with reference to FIGS. 9A and 9B. FIG. 9A shows a condition of a light beam upon reproduction of the two layer disc and FIG. 9B shows the condition of the light beam within the two layer disc. It is noted that the optical components shown in FIGS. 9A and 9B are the same as those shown in FIG. 1, and accordingly, the explanation thereto will be omitted.

The light beam emitted from the semiconductor laser 1, is focused onto a recoding surface 23 to be reproduced on an optical disc 22, in a manner similar to that explained hereinabove. The light beam reflected upon the recording surface 23 travels on the same optical path as that of the light beam incident upon the recording surface 23, and is then incident upon the optical detector 16, as indicated by the solid line in the figure. It is noted here that the two layer disc is an optical disc having two recording surfaces 23, 24, and accordingly, the recording surface 23 which is located upstream as viewed from the objective lens, has a such a recording surface characteristic as to reflect thereupon the light beam by a predetermined quantity but transmits therethrough by a predetermined quantity so as to lead it to the recording surface 24. Thus, even though the optical beam is focused onto the recording surface 23, the light beam must be transmitted through the recoding surface 23 by a predetermined quantity. The light beam which is transmitted through the recording surface after it is focused on the recoding surface 23, is totally reflected on the recoding surface 24 as indicated by the dotted line in the figure, and is then incident upon the collimating lens 4 by way of the objective lens 7. The light beam reflected upon the recoding surface 24 is focused, as indicated by the dotted line in the figure, in a state different from that of the light beam reflected upon the recoding surface 23. Thus, the light beam is once focused in front of the optical detector 16 before it is incident upon the optical detector 16. Thus, the effective diameter of the light beam becomes larger, more or less on the optical detector 16.

Figure 10A:
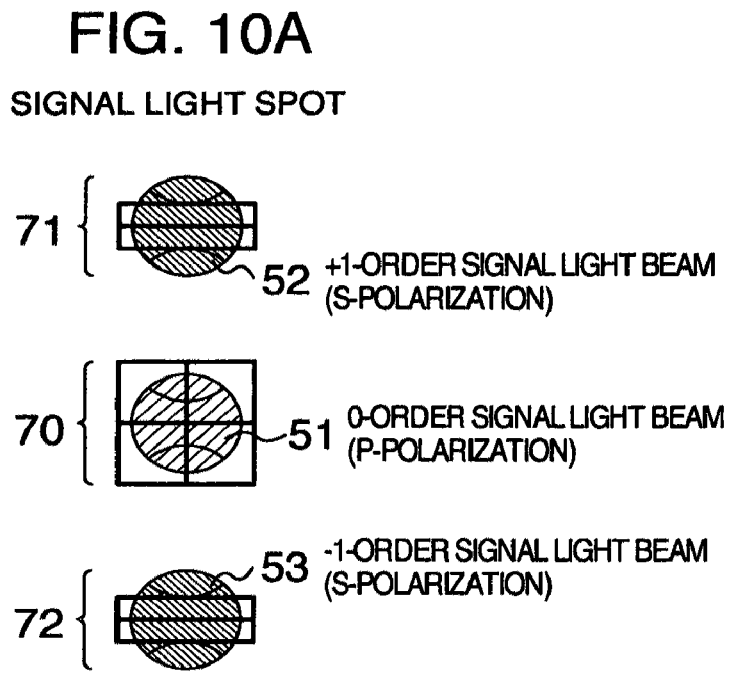
FIGS. 10A and B are views for explaining a condition of a spot on a light detector in the case of reproduction of a two layer disc.
Figure 10B:
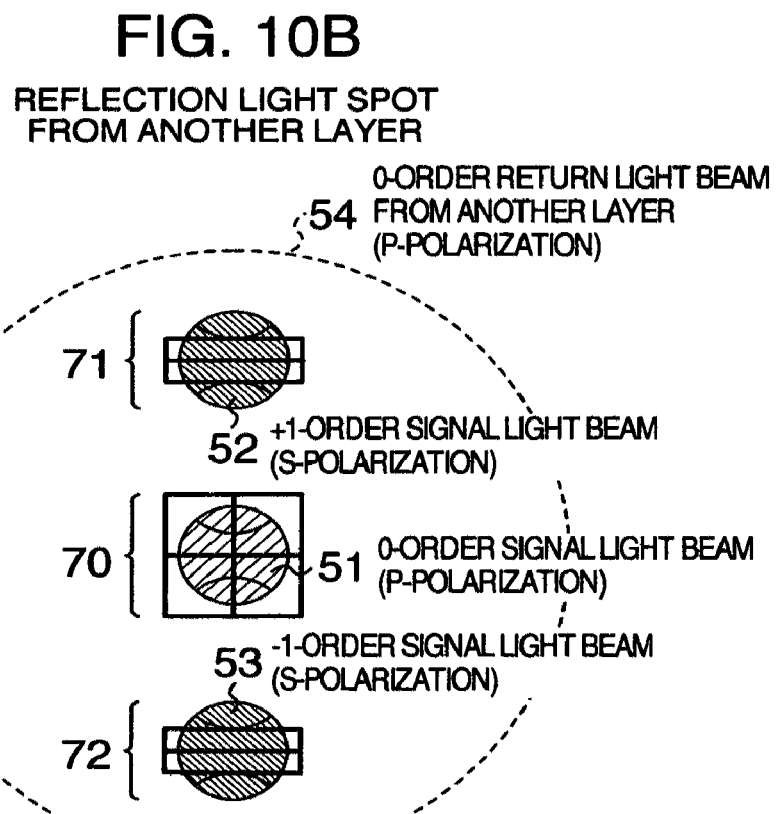

FIGS. 10A and 10B show states of spots on the optical detector in the case of reproduction of a two layer disc, that is, FIG. 10A shows spots of light signals from a desired recording surface, and FIG. 10B shows spots of reflected beams with a spot of a light beam from the other recoding surface being additionally shown. Referring to FIG. 10A, in the optical detector 16, there are arranged the light receiving zone 70, the light receiving zone 71 and the light receiving zone 72, as stated above. The position of the optical detector 16 is adjusted so that signal light beams are irradiated onto these light receiving zones 70, 71, 72 from a desired recording surface, that is, a 0-order light signal beam is irradiated onto the light receiving zone 70, and a +1-order light signal beam 52 is irradiated onto the light receiving zone 71 while a −1-order light signal beam 53 is irradiated onto the light receiving zone 72. Thus, by computing output signals from the light receiving zones 70, 71, 72, a focus error signal by the astigmatic detection method and a tracking error signal similar to that obtained by the differential push-pull process can be obtained as stated above. In the embodiment 1, in order to cause a linearly polarized beam to be incident upon the polarizing grating 14 at a predetermined angle thereto, the 0-light signal beam is P-polarized as indicated by rightwardly upward slanted lines while the ±1-order light signal beams are S-polarized as indicated by leftwardly upward slanted lines, the directions of polarization of the 0-order light signal beam and the ±1-order light signal beams being orthogonal to each other.

In the case of reproduction of a two layer disc, as stated above, a return light beam 54 from a 0-order light beam reflected upon the other layer is irradiated on the detection surface of the optical detector. This return light beam 54 is substantially concentric with the 0-order light signal beam, as shown in FIG. 10b, having its diameter which is relatively large so as to include not only the light receiving zone 70 but also the light receiving zones 71 and 72. The return light beam 54 irradiated onto the light receiving zone 71 onto which the +1-order light signal beam 52 is also irradiated, has a light quantity which is equal to or one-several of that of the +1-order light signal beam 52, and has an optical path length which is substantially equal to that of the beam 52. Thus, should the return light beam 54 and the +1-order light beam are combined in one and the same polarized state, the return light beam 54 would interfere with the +1-order light beam, being caused by a variation in a space between the recoding surface 23 and the recording surface 24. In this case, the tracking error signal obtained from the light receiving zone 71 would cause a variation due to the interference. In the embodiment 1 of the present invention, the return light 54 is P-polarized while the +1-order light signal beam 52 is S-polarized. Thus, although the return light beam 54 slightly increases its total light quantity at the light receiving zone 71, but does not cause any variation by the interference. Thus, the tracking error signal which can be delivered from the light receiving zone 71 and the light receiving zone 72 does never cause variation by the interference.

In other words, the 0-order light beam and the ±1-order light beams from which the tracking error signal is obtained, have their polarization which are orthogonal to each other, and the tracking signal is obtained from a difference signal therebetween. Thus, no interference is caused between the 0-order light beam and the ±1-order light beams, thereby it is possible to obtain a satisfactory tracking error signal.

Figure 11:
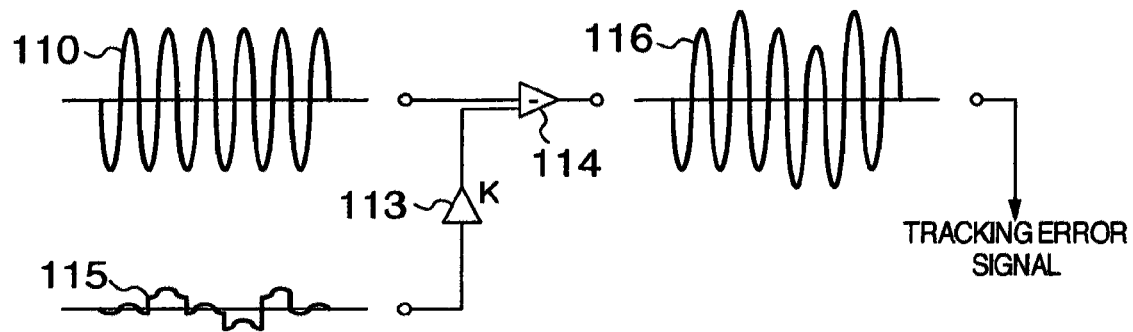
FIG. 11 is a view for explaining fluctuation of a tracking error signal in a conventional optical pickup.

Next, explanation will be made of variation in a tracking error signal in a conventional optical pick up with reference to FIG. 11. Referring to FIG. 11, a waveform 110 is a push-pull signal of a 0-order light beam, which is obtained from a signal detected in the light receiving zone 70. A waveform 115 exhibits variation, being affected by the return light beam 54 from the other layer. Thus, in the configuration of the optical pickup, the tracking error signal largely varies as indicated by a waveform 116, and accordingly, stable servo cannot be applied. However, with the configuration of the optical pickup explained in the embodiment 1, it is possible to obtain a satisfactory tracking error signal as shown in FIG. 7.

Embodiment 2

Figure 12:
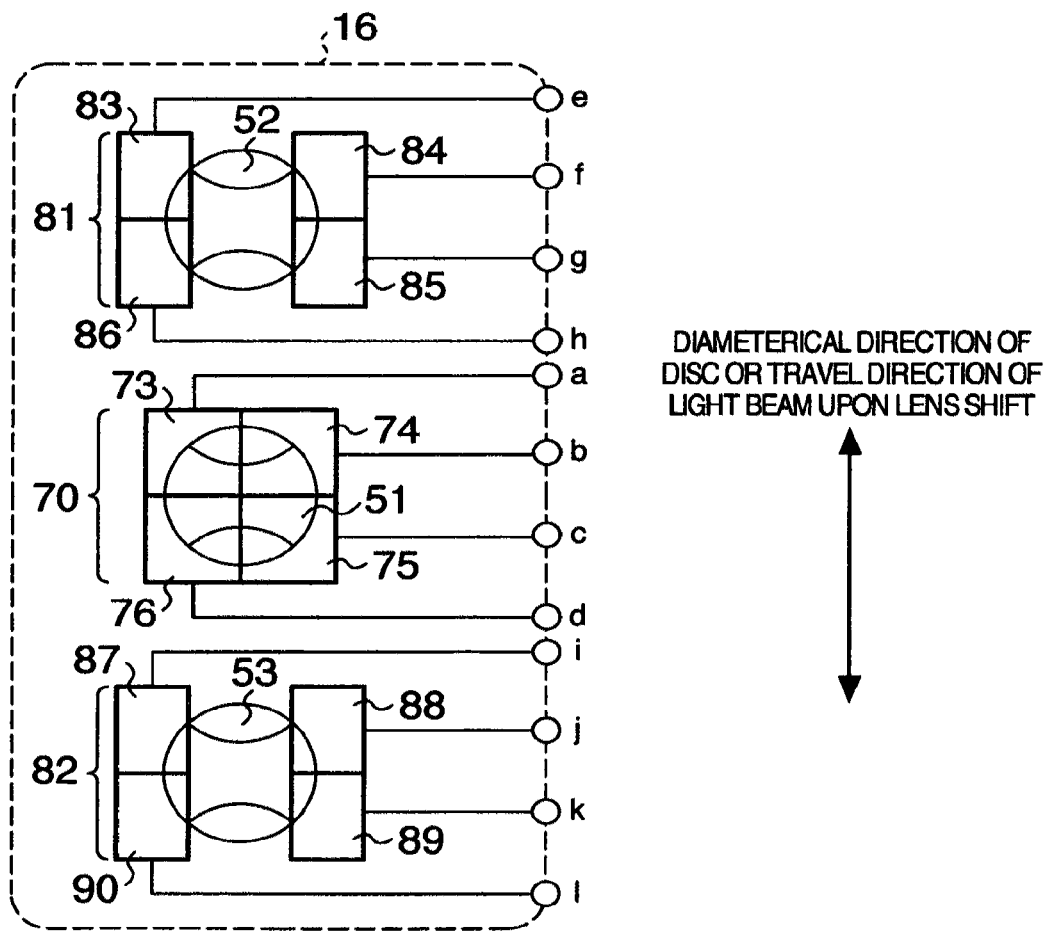
FIG. 12 is a view illustrating a light receiving zones in an optical detector in an embodiment 2 of the present invention.

Next, explanation will be made of an embodiment 2 of the present invention with references to FIGS. 12 and 13. FIG. 12 is a view illustrating light receiving zones in an optical detector in the embodiment 2. The arrangement of components of the optical pickup in the embodiment 2 is the same as that shown in FIG. 1 as explained hereinabove, like reference numerals are used to denote components like to those shown in FIG. 6. The embodiment 2 has the same configuration as that shown in FIG. 6, except that a light receiving zone 81 and a light receiving zone 82 each having a gap in its center part along a radial direction or a travel direction of an optical beam during shifting of a lens, are provided, in stead of the light receiving zone 71 and the light receiving zone 72, as shown in FIG. 12, at positions where the +1-order light beam 52 and the −1-order light beam are irradiated. The light receiving zone 81 is composed of rectangular light receiving surfaces 83, 84, 85, 86, the light receiving surfaces 83, 86 and the light receiving zones 84, 85 being paired, respectively, with their one sides abutting to each other. Outputs from the light receiving surfaces 83, 84, 85, 86 are delivered from terminals e, f, g, h, respectively. Further, the light receiving zone 82 is composed of rectangular light receiving surfaces 87, 88, 89, 90, the light receiving surfaces 87, 90 and the light receiving surfaces 88, 89 are paired, respectively, with their one sides abutting to each other. Outputs from the light receiving surfaces are delivered to terminals i, j, k, l, respectively.

It is noted here that the gap in the center part of the light receiving zone 81 onto which the +1-order light beam 52 diffracted by the polarizing grating 14 is irradiated, is set so as to have such a light receiving surface shape that a part of the light beam 52 which just generates a diffracted pattern is removed in a band-like shape. Further, the gap in the center part of the light receiving zone 82 onto which the −1-order light beam 53 is irradiated is set so as to have such a light receiving surface shape that a part of the light beam 53 which just generates a diffracted pattern is removed in a bank-like shape.

Next, explanation will be made of methods of generating a focus error signal and a tracking error signal. The focus error signal is generated in the same method as stated in the embodiment 1, and accordingly, explanation thereto will be omitted.

Meanwhile, the tracking error signal can be computed from output signals which are obtained from the 0-order light beam 51, the +1-order light beam 52 and the −1-order light beam 53 with the use of the following formula, similar to the DPP process as shown in FIG. 6.

$$\text{Tracking Error Signal} = ((a+b)-(c+d)) - K^*(((e+f)-(g+h)) + ((i+j)-(k+1)))$$

where the first term in the posterior term, that is, (e+f)−(g+h), is adapted to generate an offset signal proportional to a diametrical shift of the objective lens 7, by detecting a positional displacement of a spot of the +1-order light beam 52 and a variation in the light quantity of distribution thereof, in response to the diametrical shift of the objective lens 7. Further, the second term in the posterior term, (i+j)−(k+1) is adapted to generate an offset signal proportional to a diametrical displacement of the objective lens 7 by detecting a positional displacement of a spot of the −1-order light beam and a variation in the light quantity of distribution thereof. An offset signal obtained from the entire posterior term ((e+f)−(g+h))+((i+j)−(k+1)) is detected from parts where no diffraction patterns, of the +1-order light beam and the −1-order light beam are generated, and accordingly, it does not substantially include a push-pull signal component, as is the waveform 111 shown in FIG. 7. Thus, a tracking error signal having a satisfactory waveform with no DC offset can be obtained, similar to the embodiment 1. Thus, even though the objective lens is radially shifted, it is possible to prevent occurrence of a DC offset in the tracking signal. Further, with this configuration, even though the lens shift value is larger, it is possible to prevent a push-pull signal component from straying into the signals obtained from the light receiving zone 81 and the light receiving zone 82.

Figure 13A:
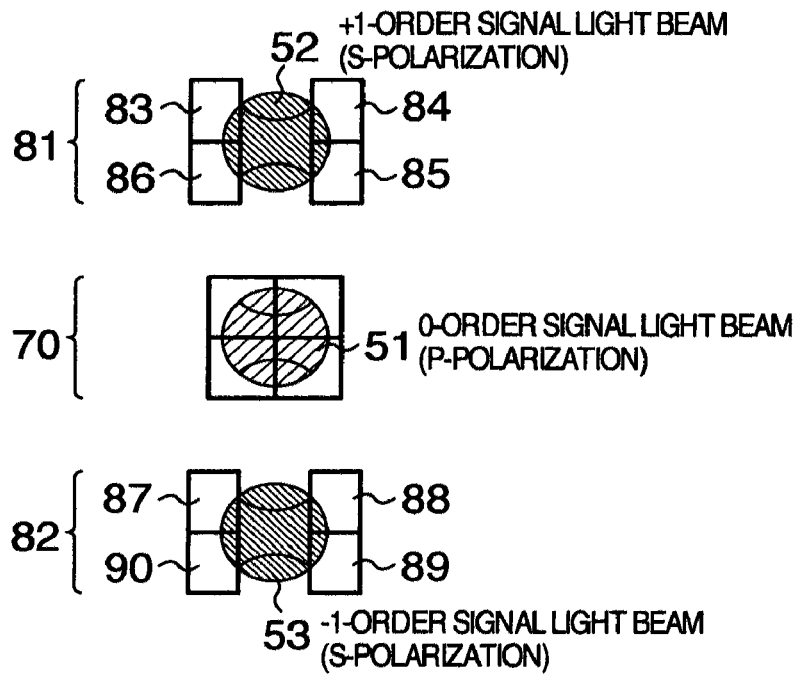
FIGS. 13A and B are views for explaining conditions of spots on an optical detector in the case of reproduction of a two layer disc.
Figure 13B:
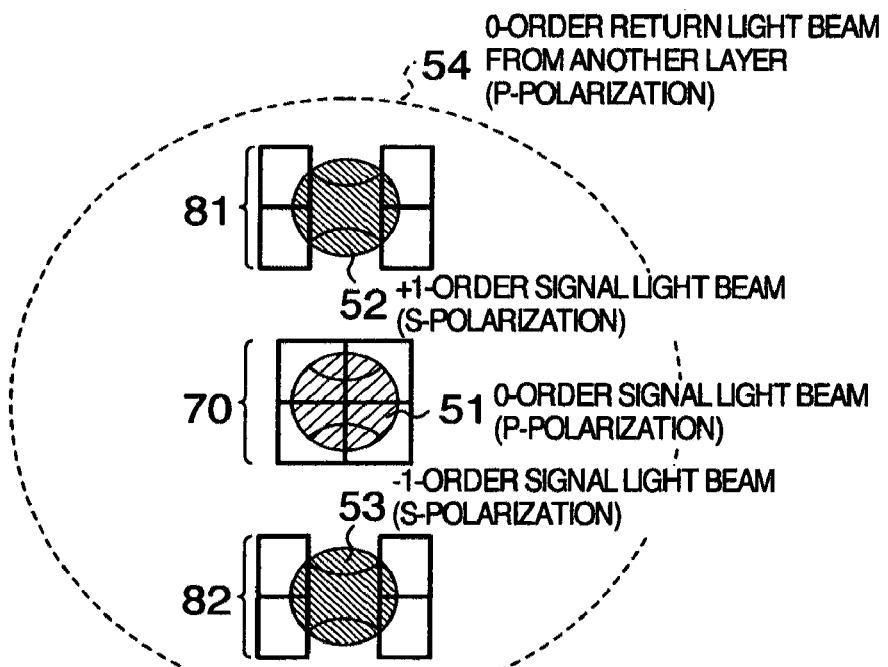

FIGS. 13A to 13B are views which show conditions of spots on the optical detector in the case of reproduction of a two layer disc, that is, FIG. 13A shows spots of signal light beams from a desired recording surface and FIG. 13B additional shows a spot of a reflected light beam from the other recording surface. Referring to FIG. 13A, in the optical detector 16, there are provided the light receiving zone 70, the light receiving zone 81, and the light receiving zone 82, as stated above, and the optical detector 16 is positionally adjusted so that signal light beams from a desired recording surface are irradiated onto these light receiving zones, that is, the P-polarized 0-order light beam 51 is irradiated onto the light receiving zone 70, and the S-polarized +1-order light beam 52 is irradiated onto the light receiving zone 81 while the S-polarized −1-order light beam 53 is irradiated onto the light receiving zone 82. Further, the direction of the 0-order light beam and that of the ±1-light beams are orthogonal to each other, similar to the embodiment 1.

In the case of reproduction of a two layer disc, the return light beam 54 from the 0-order light beam reflected from the other layer is irradiated on the surface of the optical detector, similar to the embodiment 1. This return light beam 54 is substantially concentric with the 0-order light beam, as shown in FIG. 13b, having a diameter which is so large as to include therein not only the light receiving zone 70 but also the light receiving zone 81 and the light receiving zone 82. However, in the embodiment 2, the return light beam 54 of the 0-order light beam is P-polarized, but the +1-order light beam 52 and the −1-order light beam 53 are S-polarized, and accordingly, the total light quantity on the light receiving zone 81 and the light receiving zone 82 is slightly increased, but the return light beam 54 does not substantially cause variation due to interference, thereby it is possible to prevent the tracking signal which can be delivered from the light receiving zone 81 and the light receiving zone 82, from being varied by interference.

Embodiment 3

Figure 14:
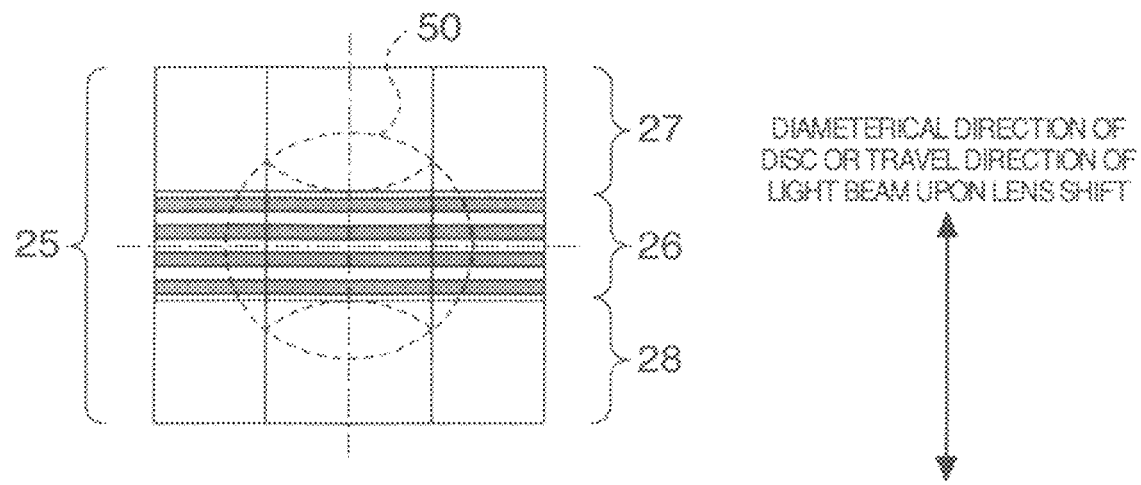
FIG. 14 is a view illustrating a pattern of a polarizing grating in an embodiment 3 of the present invention.
Figure 15:
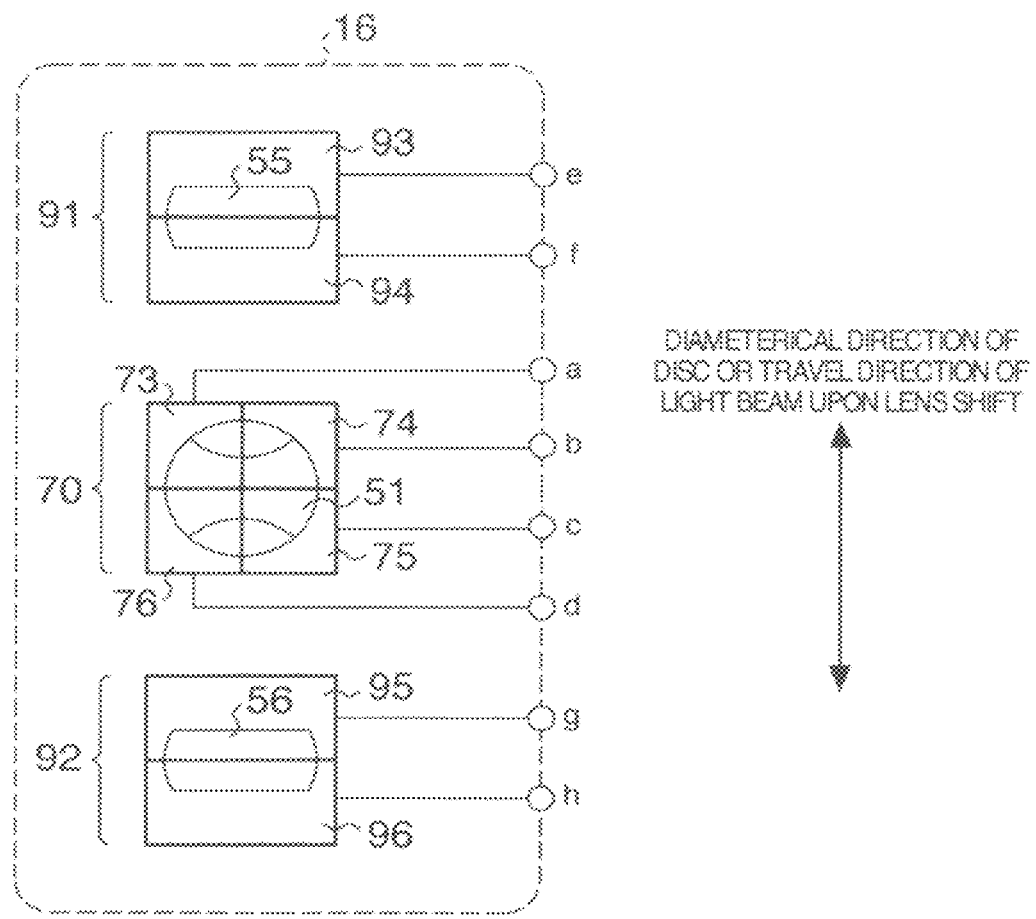
FIG. 15 is a view illustrating a pattern of a light receiving surface of an optical detector.

Next, explanation will be made of an embodiment 3 with reference to FIGS. 14 to 16. FIG. 14 shows a pattern of a polarizing grating in the embodiment 3. The arrangement of components in the embodiment 3 is the same as that shown in FIG. 1, as stated above, and like reference numerals are used to denote light receiving surfaces in an optical detector 16, like to those shown in FIG. 6. Referring to FIG. 14, a belt-like polarizing grating zone 26 is formed in the center part of the outer surface of a polarizing grating 25 in a direction orthogonal to the diametrical direction of a disc, and a zone 27 and a zone 28 which have not grooves are present on opposite sides of the zone 26. The polarizing grating zone 26 is adapted to diffract only a S-polarized beam by about 100%, but to transmit A P-polarized light beam by about 100%. Further, the polarizing grating zone 26 has a width which is set to a value with which the zone 26 does not overlap with a zone where a push-pull component of the light beam 50 generates. With the polarizing grating having the above-mentioned configuration, the P-polarized component of the light beam 50 is transmitted therethrough over the entire range, but only the part of the S-polarized component of the light beam 50 which is incident upon the polarizing grating zone 26 is diffracted while those parts which are incident upon the zone 27 and the zone 28 having no diffraction grooves are transmitted.

Next, explanation will be made of the light receiving surface pattern of the optical detector with reference to FIG. 15 which shows the light receiving surface pattern of the optical detector 16 in the embodiment 3, three light receiving zones 70, 91, 92 are formed on the optical detector 16, the light receiving zone 91 and the light receiving zone 92 are arranged at positions which are symmetric with each other about the light receiving zone 70. Components in the optical pickup are arranged, similar to those shown in FIG. 1 as stated above, and accordingly, like reference numerals are used to denote components like to those shown in FIG. 6. Referring to FIG. 15, the pattern of the optical detector is the same as that shown in FIG. 6, except that the light receiving zone 91 and the light receiving zone 92 are located at positions onto which a +1-order light beam 55 and a −1-order light beam 53 diffracted by the polarizing grating 25 are irradiated, instead of the light receiving zone 71 and the light receiving zones 72.

The light receiving zone 70 is similar to that shown in FIG. 6, and accordingly, explanation thereto will be omitted. The light receiving zone 91 has two light receiving surfaces 93, 94 which vertically abut to each other. Outputs from the respective light receiving surfaces 95, 96 are delivered from a terminal e for the light receiving surface 93 and a terminal f for the light receiving surface 94, respectively. The light receiving zone 92 has two light receiving surfaces 95, 96 which vertically abut to each other. Output from the light receiving surfaces 95, 96 are delivered from a terminal g for the light receiving surface 95 and a terminal h for the light receiving surface 96, respectively.

It is noted in the embodiment 3 that the 0-order light beam 51 which has passed through the polarizing grating 25 as it is, is set to be irradiated onto the light receiving zone 70 in the vicinity of the center of the latter, and the +1-order light beam 55 diffracted by the polarizing grating 25 is set to be irradiated onto the light receiving zone 91 in the vicinity of the center of the latter while the −1-order light beam 56 is set to be irradiated onto the light receiving zone 92 in the vicinity of the center of the latter.

Next, explanation will be made of a method of generating a focus error signal and a tracking error signal in the embodiment 3. The focus error signal is generated in a configuration similar to that explained in the embodiment 1, and accordingly, explanation thereto will be omitted.

Meanwhile, the tracking error signal can be obtained by computing the following formula, similar to the DPP method as shown in FIG. 6, from output signals which can be obtained from the 0-order light beam 51, the +1-order light beam 55 and −1-order light beam 56, respectively.

Tracking Error Signal=$((a+b)-(c+d))-K^*((e-f)+(g-h))$

It is noted in the embodiment 3 that an offset signal which is proportional to a radial shift of the objective lens 7 is generated in the first term (e−f) in the posterior term by detecting a displacement of a position of a spot of the +1 order light beam 55 caused by a radial shift of the objective lens and a variation in light quantity of distribution thereof. At that time, the +1-order light beam 56 is obtained by diffracting a light beam from the center part where no diffracted pattern of the light beam 50 is generated, and accordingly, a signal which has not a push-pull signal component is obtained. Similarly, an offset signal proportional to a radial shift of the objective lens 7 is generated in the second term (g−h) in the posterior term by detecting a displacement of a spot of the −1-order light beam 56 and a variation in optical quantity of a distribution. The +1-order light beam 56 is also obtained by diffracting the light beam from the center part where no diffracted pattern of the light beam 50 is generated, and accordingly, a signal which has not a push-pull signal component is obtained. Thus, an offset signal obtained from the entire posterior term ((e−f)+(g−h)) does not substantially include a push-pull signal component, as is the waveform 111 shown in FIG. 7, and accordingly, a satisfactory push-pull waveform with no DC offset can be obtained as the tracking error signal, similar to the embodiment 1.

Figure 16A:
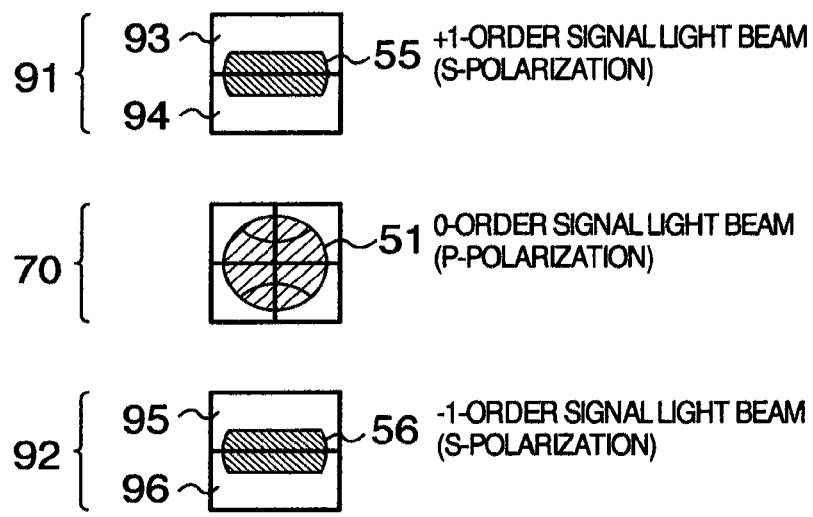
FIGS. 16A and B are views for explaining conditions of spots on an optical detector in the case of reproduction of a two layer disc.
Figure 16B:
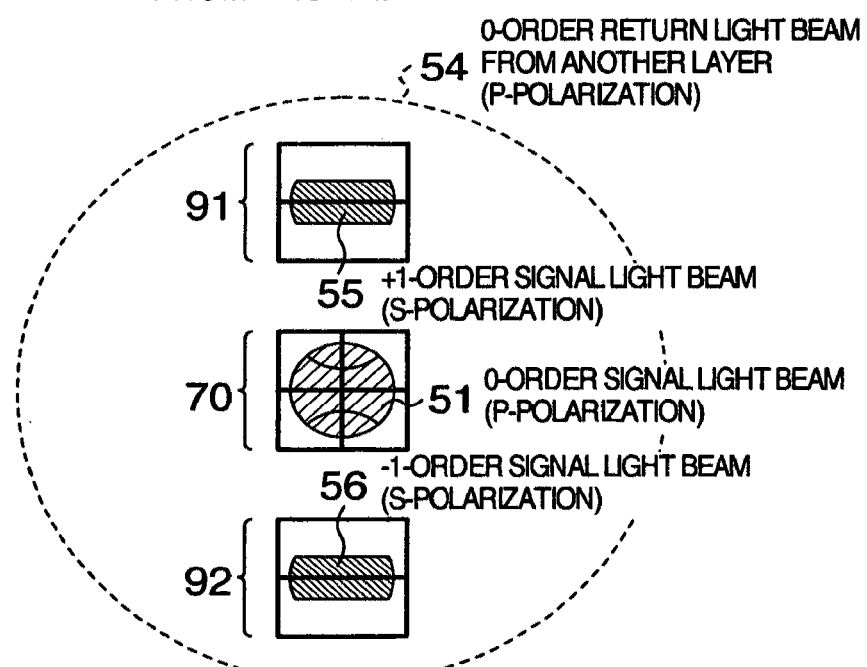

Referring to FIGS. 16A and 16B which show states of spots on the light detector in the case of reproduction of a two layer disc, that is, FIG. 16A shows states of spots of signal light beams from a desired recording surface while FIG. 16B additionally shows a state of a spot of a signal light beam from the other recording surface. Referring to FIG. 16A, the light receiving zone 70, the light receiving zone 91 and the light receiving zone 92 as stated above are arranged in the optical detector, and the optical detector 16 is positionally adjusted so that the signal light beams from the desired recording surface are irradiated onto these light receiving zones, that is, the P-polarized 0-order light beam 51 is irradiated onto the light receiving zone 71, and the S-polarized +1-order light beam 55 is irradiated onto the light receiving zone 91 while the S-polarized −1-order light beam 56 is irradiated onto the light receiving zone 92. Further, the polarized directions of the 0-order light beam and ±1-order light beams are orthogonal to each other, similar to the embodiment 1 and the embodiment 2.

In the case of the reproduction of a two layer disc, similar to the embodiment 1 and the embodiment 2, the return light beam 54 from the 0-order light beam reflected upon the other layer is irradiated onto the surface of the optical detector. This return light beam 54 is substantially concentric with the 0-order signal light beam, and the diameter thereof is so large as to include not only the light receiving zone 70 but also the light receiving zones 91, 92. However, in the embodiment 3, the 0-order return light beam 54 is P-polarized while the +1-order light beam 55 and the −1-order light beam are S-polarized, and accordingly, although the total light quantity of the light receiving zone 91 and the light receiving zone 92 is slightly increased, it does not cause a variation due to interference. Thus, the tracking error signal which can be delivered from the light receiving zone 91 and the light receiving zone 92 is never varied by the interference.

Embodiment 4

Figure 17:
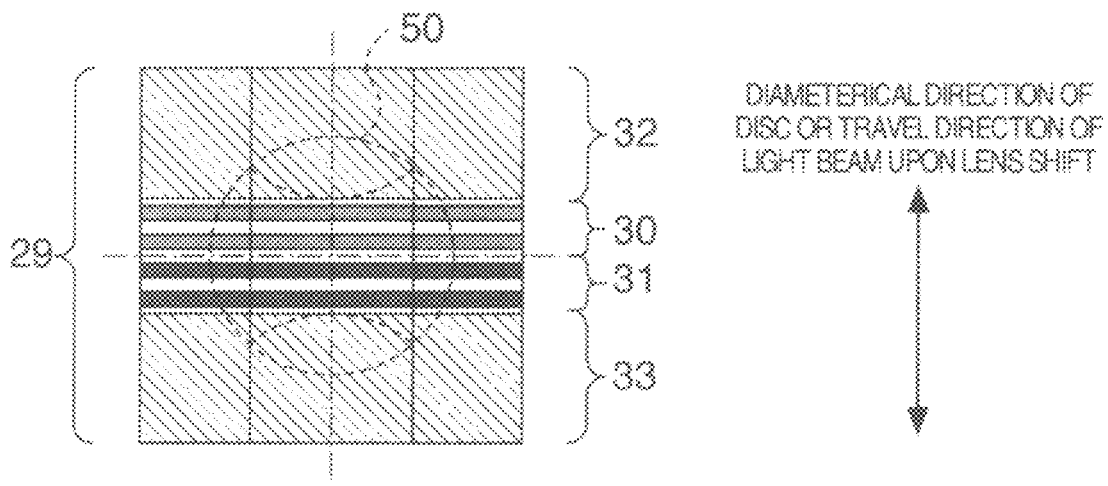
FIG. 17 is a view illustrating a pattern of a polarizing grating in an embodiment 4 of the present invention.
Figure 18:
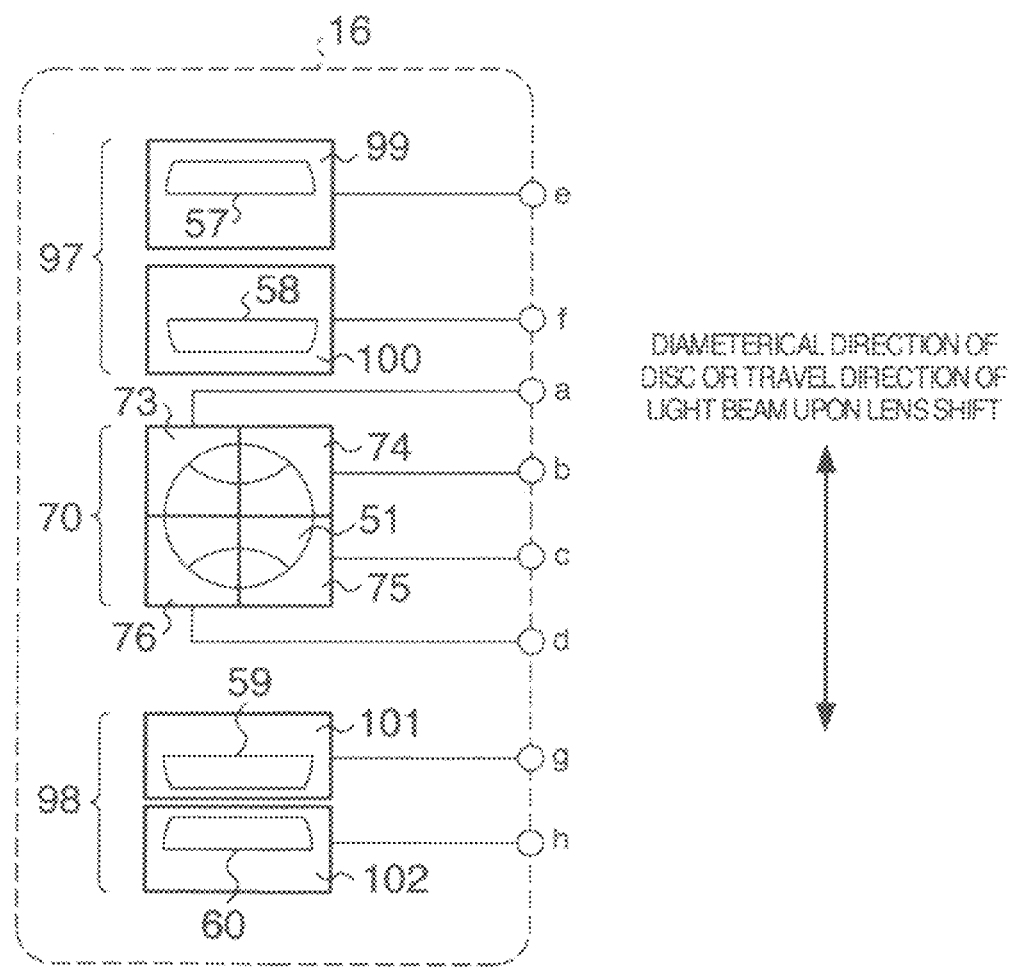
FIG. 18 is a view illustrating a pattern of a light receiving surface of an optical detector.

Next, explanation will be made of an embodiment 4 of the present invention with reference to FIGS. 17 to 19. FIG. 17 is a view which shows a pattern of a polarizing grating in the embodiment 4. The arrangement of the components of an optical pickup in the embodiment 4 is the same as that shown in FIG. 1 as stated above, and accordingly, like reference numerals are used to denote light receiving surfaces like to those shown in FIG. 6. Referring to FIG. 17, two belt-like polarizing grating zones 30, 31 are arranged in the center part of the outer surface of a polarizing grating 29 in a direction orthogonal to the radial direction of a disc, and a polarizing grating zone 32 and a polarizing grating zone 33 are formed on both sides of the above-mentioned grating zones 30, 31.

It is noted here that each of the polarizing grating zones 30, 31 is adapted to diffract only an S-polarized light beam by about 100%, but to transmit therethrough a P-polarized light beam by about 100%. Further, the polarizing grating zones 30, 31 are arranged so as to abut together at their one side in the vicinity of the center of the polarizing grating 29, each having such a width that either the zone 30 or the zone 31 does not overlap with the zone where a push-pull component of the light beam 50 is generated. With the polarizing grating having the above-mentioned configuration, the P-polarized component of the light beam is transmitted over the entire zone, but the S-polarized component of the light beam 50 is diffracted at the respective four zones, that is, the polarizing grating zones 30 to 34. It is noted that the polarizing grating zones 30 and 31 have groove pitches of grating which are set so that the light beam is irradiated onto the light receiving surfaces of the optical detector 16 while the polarizing grating zones 32 and 33 have groove pitches of grating which are set so as to have such a diffraction angle as to prevent the light beam from being irradiated onto the light receiving surfaces of the optical detector 16.

Next, explanation will be made of the patterns of light receiving surfaces of the optical detector 16. Referring to FIG. 18 which shows the pattern of the light receiving surfaces of the optical detector 16 in the embodiment 4, three light receiving zones 70, 97, 98 are formed on the optical detector 16, the light receiving zone 97 and the light receiving zone 98 being arranged, symmetric with each other about the light receiving zone 70. In the embodiment 4, the arrangement of components in an optical pickup is the same as that shown in FIG. 1 as stated above, and accordingly, like reference numerals are used to denote components, in the optical detector, like to those shown in FIG. 6.

Referring to 18, a light receiving zone 97 is located at a position onto which the +1-order light beam 57 diffracted at the zone 30 of the polarizing grating 29 and +1-order light beam 58 diffracted at the zone 31 of the polarizing grating are irradiated, and a light receiving zone 98 is located at a position onto which the −1-order light beam 59 diffracted at the zone 30 of the polarizing grating and the −1-order light beam 60 diffracted at the zone 31 of the polarizing grating are irradiated.

The light receiving zone 70 is similar to that shown in FIG. 6, and accordingly, explanation thereof will be abbreviated. The light receiving zone 97 is composed of two light receiving surfaces 99, 100 which are arranged up and down. Outputs from the light receiving surfaces 99, 100 are delivered from terminals e, f, respectively. The light receiving zone 98 are composed of two light receiving surfaces 101, 102 which are arranged up and down. Outputs from the light receiving surfaces 101, 102 are delivered from terminals g, h, respectively.

It is noted, in the embodiment 4, that the 0-order light beam 50 which has transmitted through the polarizing grating 29 as it is, is irradiated in the vicinity of the light receiving zone 70 in the optical detector 16, the +1-order light beam 57 diffracted at the zone 30 of the polarizing grating is irradiated onto the light receiving surface 99, the +1-order light beam 58 diffracted at the zone 31 of the polarizing grating onto the light receiving surface 100, the −1-order light beam 60 diffracted at the zone 30 of the polarizing grating onto the light receiving surface 102, and the −1-order light beam 59 diffracted at the zone 31 of the polarizing grating onto the light receiving surface 101.

Next, explanation will be made of the method of producing a focus error signal and a tracking error signal in the embodiment 4. The focus error signal is produced in the same configuration as that of the embodiment 1, and accordingly, explanation thereof will be abbreviated.

Meanwhile, the tracking error signal can be computed from output signals which are obtained respectively from the 0-order light beam 51, the +1-order light beams 57, 58, the −1-order light beams 60, 59 with the use of the following formula, similar to the DPP method shown in FIG. 6.

Tracking Error Signal=$((a+b)-(c+d))-K^*((e-f)+(h-g))$

It is noted, in the embodiment 4, that an offset signal proportional to a radial shift of the objective lens 7 is generated in the first term (e−f) of the posterior term by detecting displacements of the positions and variations in light quantity of distribution of the spots of the +1-order light beams 57, 58, caused by the radial shift of the objective lens 7. At this time, since the +1-order light beams 57, 58 are diffracted at the center part where no diffracted pattern of the light beam 50 is generated, the signal has not push-pull signal component. Further, an offset signal proportional to a radial shift of the objective lens 7 is produced in the second term (h−g) of the posterior term by detecting displacements of the positions and variations in light quantity of distributions of spots of the −1-order light beams 60, 59. Since the −1-order light beams 60, 59 are also diffracted at the center part where no diffraction pattern of the light beam 50 is produced, a signal in which no push-pulls signal component is included can be produced. Thus, the offset signal which is obtained from the entire posterior term ((e−f)+(h−g)) in the above-mentioned formula does not substantially include a push-pull signal component as is the waveform shown in FIG. 7, thereby it is possible to obtain a satisfactory push-pull waveform having a no DC offset, similar to the embodiment 1, as a tracking signal.

Figure 19A:
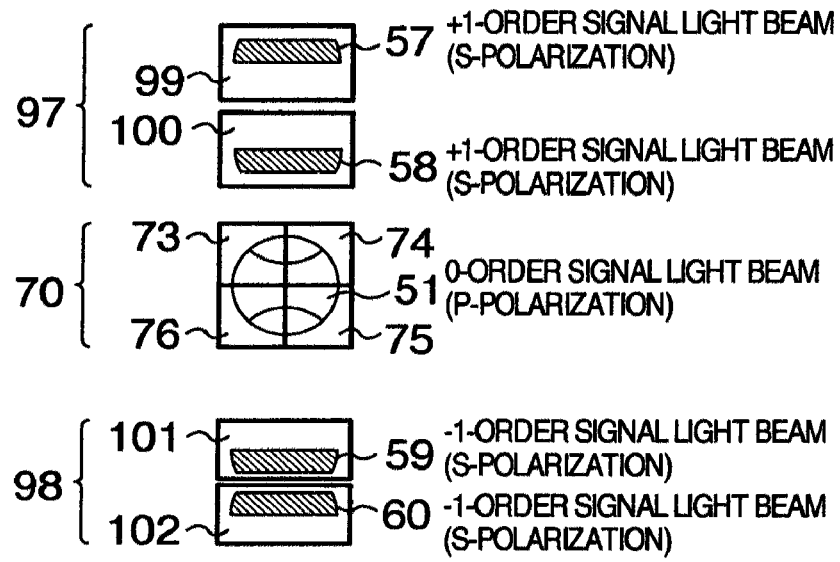
FIGS. 19A and B are views for explaining conditions of spots on an optical detector in the case of reproduction of a two layer disc.
Figure 19B:
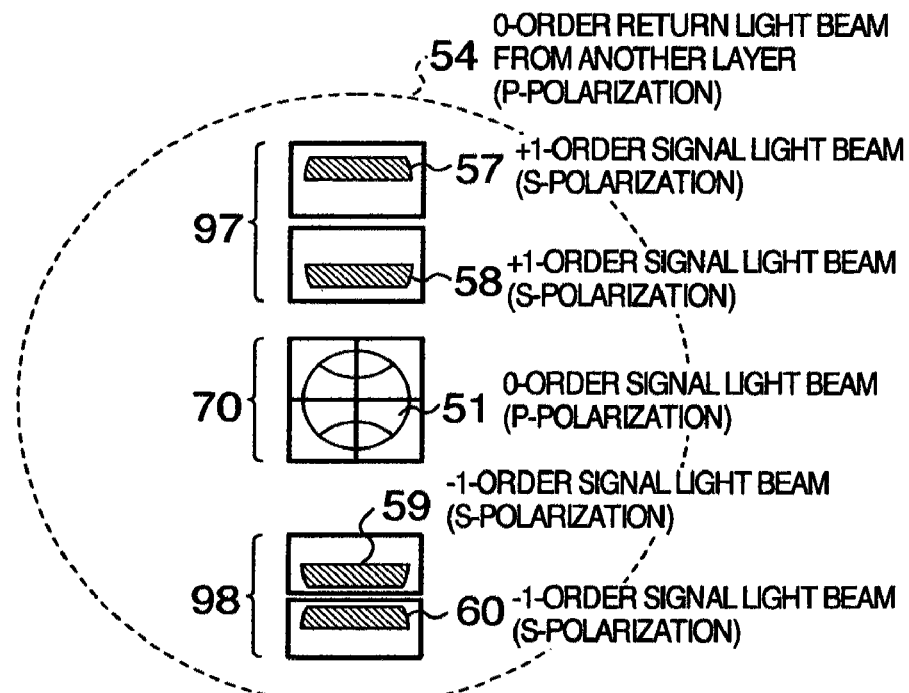

FIGS. 19A and 19B are views which show states of spots on the optical detector in the case of reproduction of a two layer disc, in which FIG. 19A shows spots of signal light beams from a desired recording surface and FIG. 19B additionally shows a spot of a reflected light beam from the other recording surface. Referring to FIG. 19A, the light receiving zone 70, the light receiving zone 97 and the light receiving zone 98 are arranged, as stated above, in the optical detector which is positionally adjusted so that the these signal light beams from the desired recording surface are irradiated onto these light receiving zones. The P-polarized 0-order light beam 51 is irradiated onto the light receiving surface 70 while the S-polarized +1-order light beams 57, 58 are irradiated onto the light receiving zone 97, and S-polarized −1-order light beams 60, 59 are irradiated onto the light receiving zone 98. Further, the direction of polarization of the 0-order-light beam is orthogonal to that of the S-polarized ±1-order light beams, similar to the embodiments 1 to 3.

In the case of reproduction of the two layer disc, the return light beam 54 obtained from the 0-order light beam reflected from the other layer is irradiated onto the surface of the optical detector, similar to the embodiments 1 to 3. This return light beam 54 is substantially concentric with the 0-order signal light beam, as shown in FIG. 19B, having a diameter which is so large as to include therein not only the light receiving zone 70 but also the light receiving zone 97 and the light receiving zone 98. However, in the embodiment 4, since the 0-order return light beam 54 is P-polarized while +1-order light beams 57, 58 and the −1-order light beams 60, 59 are S-polarized, the return light beam 54 slightly increases the total light quantity at the light receiving zone 97 and the light receiving zone 98 but does not cause variation by interference, thereby it is possible to prevent a tracking error signal which can be delivered from the light receiving zones 97, 98 from varying due to interference.

Embodiment 5

Figure 20:
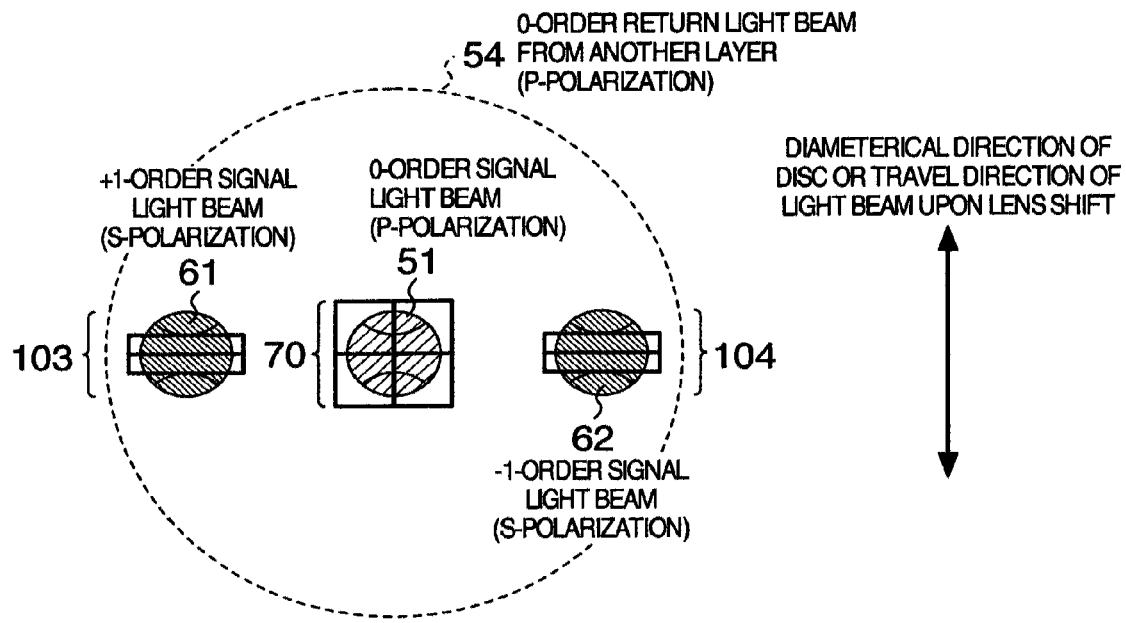
FIG. 20 is a view for explaining conditions of spots on an optical detector in an embodiment 5 of the present invention.

Next, explanation will be made of an embodiment 5 with reference to FIG. 20 which shows states of spots on the optical detector in the case of reproduction of a two layer disc, and which also shows spots of reflected light beams from the other recording surface. It is noted that the arrangement of components in the optical pickup in the embodiment 5 are identical with those shown in FIG. 1 as stated above, and accordingly, like reference numerals are used to denote components like to those shown in FIG. 6. Referring to FIG. 20, the light receiving zone 70, the light receiving zone 103 and the light receiving zone 104 are arranged in the optical detector, the configuration of the embodiment 5 is the same as that of the embodiment 1, except that the light receiving zones 103, 104 are arranged on the left and right sides of the light receiving zone 70 as viewed in the figure. The optical detector 61 is positionally adjusted so that signal light beams from a desired recording surface are irradiated onto these light receiving zones. The P-polarized 0-order light beam 51 is irradiated onto the light receiving zone 70 while the S-polarized +1-order light beam 61 is irradiated onto the light receiving zone 103, and the S-polarized −1-order light beam 62 is irradiated onto the light receiving zone 104. Further, the direction of polarization of the 0-order light beam is orthogonal to that of the ±1-light beams, similar to the embodiment 1.

In the case of reproduction of the two layer disc, similar to the embodiment 1, the return light beam 54 reflected from the other layer is irradiated onto the surface of the optical detector. This return light beam 54 is substantially concentric with the 0-order light beam, as shown in FIG. 20, having a diameter which is so large as to include not only the light receiving zone 70 but also the light receiving zones 103, 104. However, in the embodiment 5, the 0-order return light beam 54 is S-polarized but the +1-order light beam 61 and the −1-order light beam 62 are S-polarized, and accordingly, the return light beam 54 slightly increases the total light quantity at the light receiving zone 103 and the light receiving zone 104 but does not cause variation by interference, thereby it is possible to prevent a tracking error signal which can be delivered from the light receiving zone 103 and the light receiving zone 104, from varying due to interference.

With the configuration as stated above, if, for example, the wavelength of a semiconductor laser beam varies, the angle of diffraction of the ±1-order light beams diffracted at the polarizing grating 14 varies, and accordingly, does not affect upon a push-pull signal delivered from the light receiving zones 103, 104 even though the irradiated positions of the ±1-order light beams are deviated.

Embodiment 6

Figure 21:
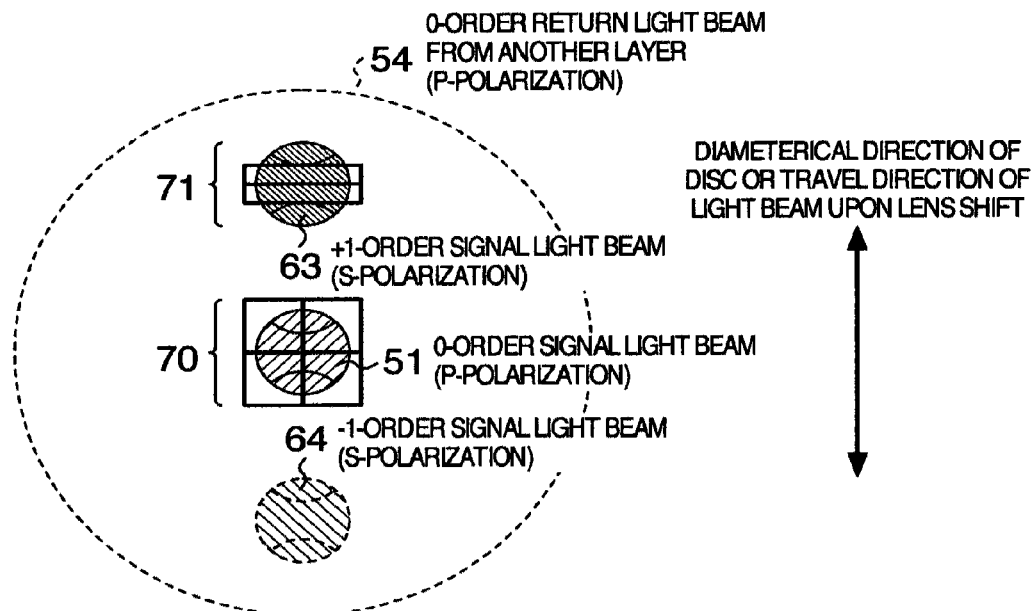
FIG. 21 is a view for explaining conditions of spots on an optical detector in an embodiment 6 of the present invention.

Explanation will be made of an embodiment 6 with reference to FIG. 21 which shows states of spots on the optical detector in the case of reproduction of a two layer disc in the embodiment 6, a sport of a reflected light beam from the other recording surface is also shown. It is noted that the arrangement of components in the optical pickup is identical with that shown in FIG. 1, and accordingly, like reference numerals are used to denote components in the optical detector, like to those shown in FIG. 6. Referring to FIG. 21, the light receiving zone 70 and the light receiving zone 71 are arranged in the optical detector, similar to those shown in FIG. 1, except that the 1-order light beam signals are detected only by the light receiving zone 71. The optical detector 16 is positionally adjusted so as to cause signal lights from the desired recording surface to be irradiated onto these recording zones. The P-polarized 0-order light beam is irradiated onto the light receiving zone 70, the S-polarized +1-order light beam 61 is irradiated onto the light receiving zone 71. Further, the 0-order light beam is polarized in a direction orthogonal to that of the ±1 order light beams, similar to the embodiment 1.

In the case of reproduction of a two layer disc, similar to the embodiment 1, the 0-order return light beam 54 reflected from the other layer is irradiated onto the surface of the optical detector. This return light beam 54 is substantially concentric with the 0-order light beam, as shown in FIG. 21, having a diameter which is so large as to include the light receiving zone 70 but also the light receiving zone 71. However, in the embodiment 6, since the 0-order return light beam 54 is P-polarized while the +1-order light beam 63 and the −1-order light beam 64 are S-polarized, the return light beam slightly increases the quantity of light at the light receiving zone 71, but does not cause variation by interference, thereby it is possible to prevent a tracking error signal which can be delivered from the light receiving zone 71 from varying due to interference.

Embodiment 7

Figure 22:
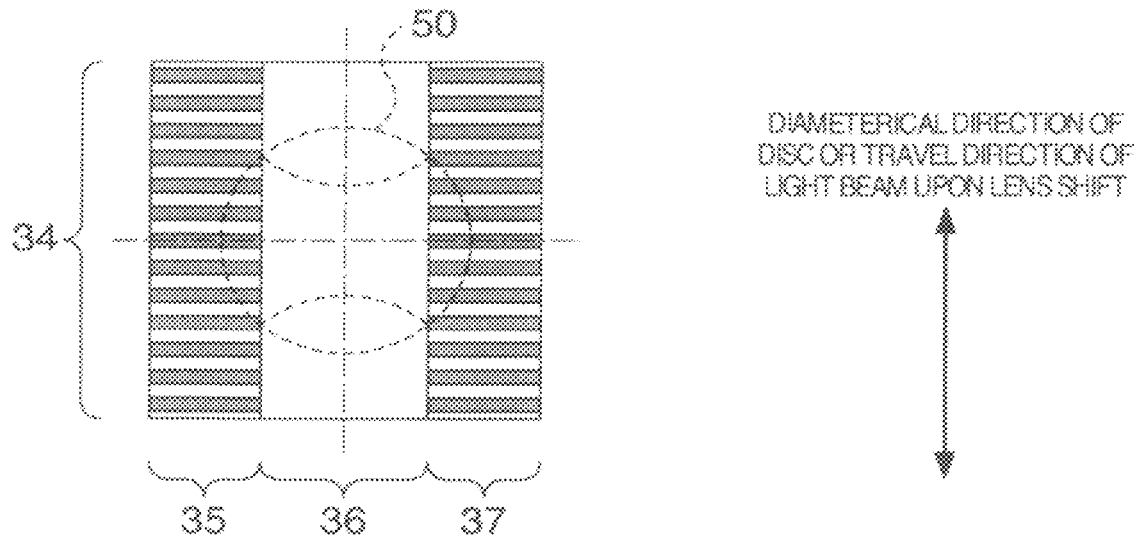
FIG. 22 is a view illustrating a pattern of a polarizing grating in an embodiment 7 of the present invention.
Figure 23:
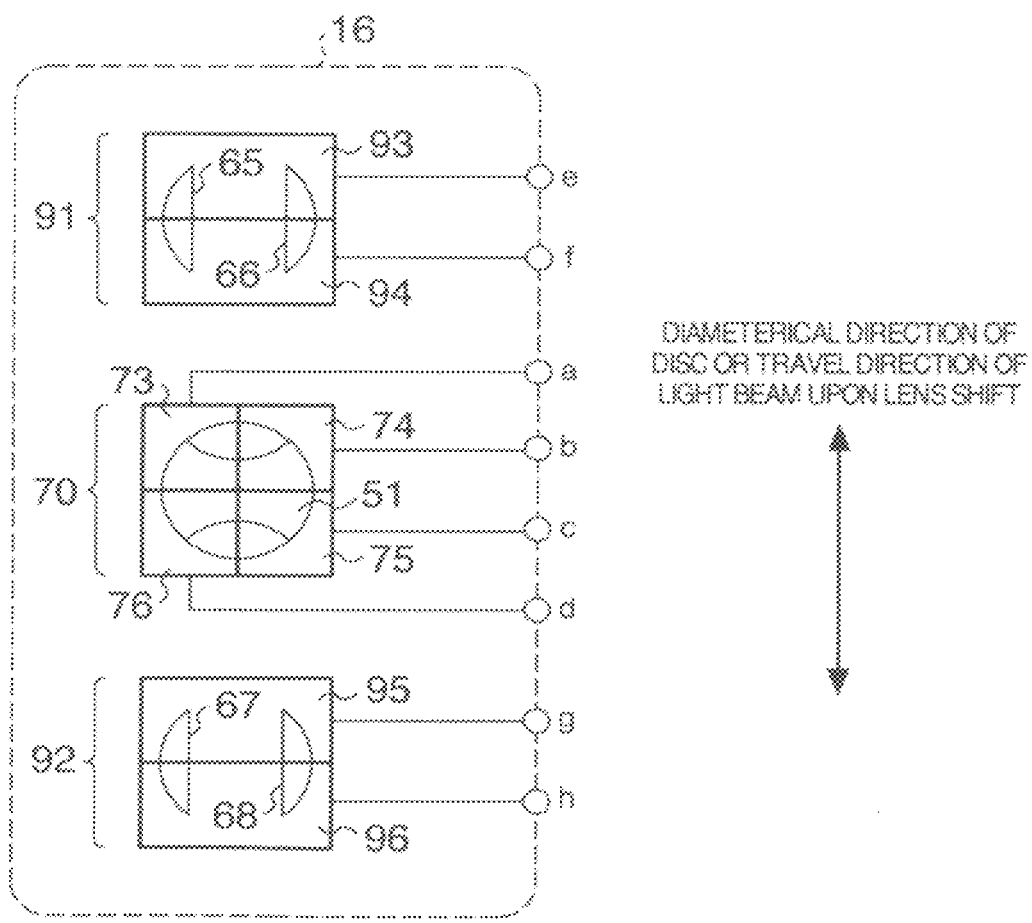
FIG. 23 is a view illustrating a pattern of a light receiving surface of an optical detector.

Next, explanation will be made of an embodiment 7 of the present invention with reference to FIGS. 22 to 24. FIG. 22 is a view which shows a pattern of a polarizing grating 34 in the embodiment 7. Then arrangement of components in the optical pickup in the embodiment 7 is identical with that shown in FIG. 1 as stated above, and accordingly, like reference numerals are used to denote light receiving surfaces like to those shown in FIG. 15. Referring to FIG. 22, a polarizing grating zone 35 and a polarizing light receiving zone 37 are formed in the outside parts of the polarizing grating 34 in a belt-like configuration along the radial direction of the disc, a zone 36 having no grating grooves being interposed therebetween. It is noted here that the polarizing grating zones 35 and 37 are adapted to diffract only S-polarized light beams by about 100% but to transmit the P-polarized beam by about 100%. Further, the inward widthwise positions of the polarizing grating zones 36 and 37 are set so as to be prevent from overlapping a zone where a push-pull component of the light beam 50 is generated. With the provision of the polarizing grating as stated above, the P-polarized component of the light beam 50 is transmitted through the all zones, but the S-polarized component of the light beam 50 is diffracted only in the parts which overlap with the polarizing grating zones 35 and 37, but is transmitted through the part 36 in the part where no grating grooves are present.

Next, explanation will be made of a light receiving surface pattern of the optical detector. Referring to FIG. 23 which shows the light receiving surface pattern of the optical detector 16 in the embodiment 7, the three light receiving zones 70, 91, 92 are formed on the optical detector 16, in the same configuration as that explained with reference to FIG. 15, and, accordingly, explanation thereof will be abbreviated.

In the embodiment 7, the optical detector 16 is set so that the 0-order light beam 50 which has been transmitted through the polarizing grating 34 as it is, is irradiated onto the light receiving zone 70 around the center thereof in the optical detector 16 while a +1-order light beam 65 which has been diffracted at the polarizing grating zone 35 and a +1-order light beam 66 diffracted at the polarizing grating zone 37 are irradiated onto the light receiving zone 91, and a −1-order light beam 67 diffracted at the polarizing grating zone 35 and a −1-order light beam 68 diffracted at the polarizing grating zone 37 are irradiated onto the light receiving zone 92 around the center thereof. With this configuration, it is possible to produce a focus error signal and a tracking error signal, similar to that explained in the embodiment 3.

Figure 24:
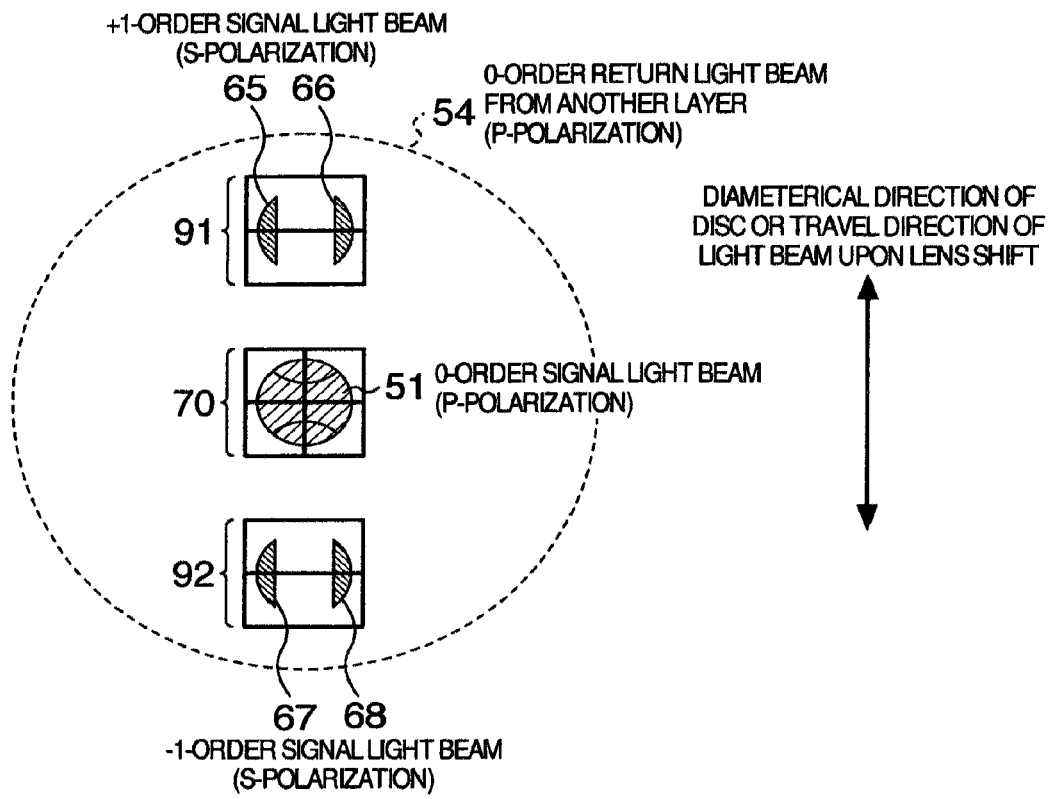
FIG. 24 is a view for explaining conditions of spots on an optical detector in the case of reproduction of a two layer disc.

FIG. 24 shows states of spots on the optical detector in the case of reproduction of a two layer disc. That is, FIG. 14 shows spots of signal light beams from a desired recording surface, and a spot of a reflected light beam from the other recording surface. Since the light receiving zone 70, the light receiving zone 91 and the light receiving zone 92 are arranged in the optical detector 16, as stated above, and the optical detector 16 is positionally adjusted so as to cause the signal light beams from the desired recording surface to be irradiated onto these light receiving zones, that is, the P-polarized 0-order light beam 51 is irradiated onto the light receiving zone 70 while the S-polarized +1-order light beams 65, 66 are irradiated onto the light receiving zones 91, and the S-polarized −1-order light beams 67, 68 are irradiated onto the light receiving zone 92. Further, the 0-order light beam is polarized in a direction orthogonal to the direction of polarization of the +1-order light beam, similar the embodiment 1.

In the case of reproduction of the two layer disc, similar to the embodiment 1, the 0-order return light beam 54 reflected from the other layer is also irradiated onto the surface of the optical detector. This return light beam 54 is substantially concentric with the 0-order signal light beam, having a diameter which is so large as to include not only the light receiving zone 70 but also the light receiving zone 91 and the light receiving zone 92. However, in the embodiment 7, since the return light beam 54 is P-polarized while the +1-order light beams 65, 66 and the −1-order light beams 67, 68 are S-polarized, the return light beam 54 slightly increases a total light quantity at the light receiving zone 91 and the light receiving zone 92 but does not cause variation by interference, thereby it is possible to prevent the tracking error signal which can be delivered from the light receiving zones 91, 92, from varying due to interference.

Embodiment 8

Figure 25:
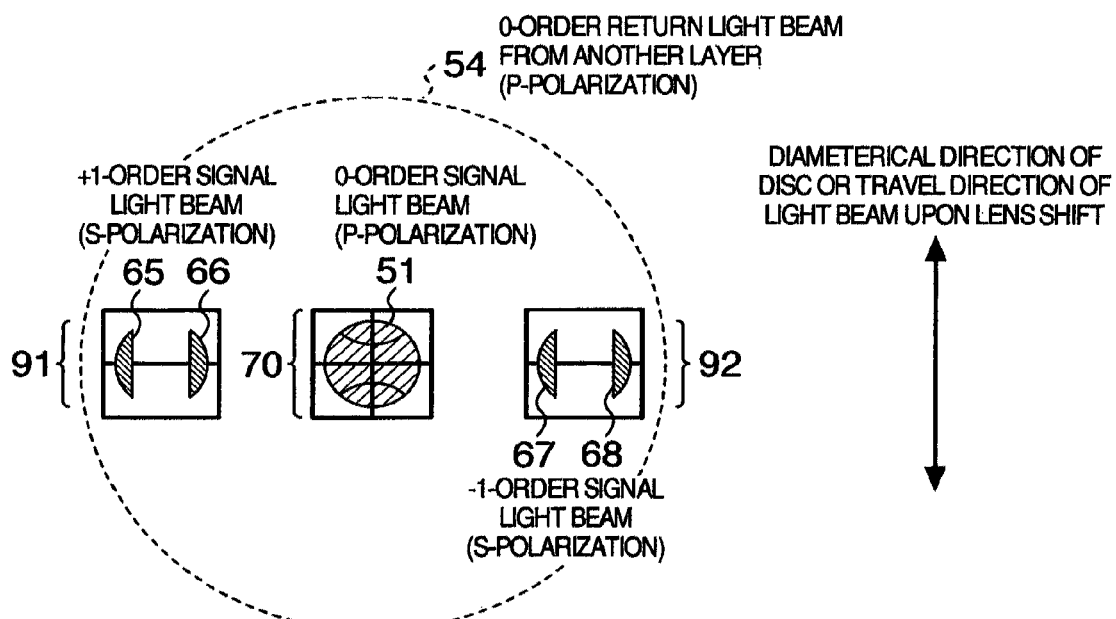
FIG. 25 is a view for explaining conditions of spots on an optical detector in the case of reproduction of a two layer optical disc in an embodiment 8 of the present invention.

Next, explanation will be made of an embodiment 8 with reference to FIG. 25 which shows states of spots on the optical detector in the case of reproduction of two layer disc in the embodiment 8, and which also shows a spot of a deflected light beam from the other recording surface. It is noted that the configuration of components in the optical pickup in the embodiment 8 is identical with that shown in FIG. 1 as stated above, and accordingly, like reference numerals are used to denote components like to those shown in FIG. 15. Referring to FIG. 25, the light receiving zone 70, the light receiving zone 91 and the light receiving zone 92 are arranged in the optical detector as stated above, and the embodiment 8 has the same configuration as that of the embodiment 7, except that the light receiving zones 91, 92 are arranged on the left and right sides of the light receiving zone 70 as viewed in the figure. The optical detector 16 is positionally adjusted so that signal light beams from a desired recording surface are irradiated onto these light receiving zones, that is, the P-polarized 0-order light beam 51 is irradiated onto the light receiving zone 70 while the S-polarized +1-order light beams 65, 66 are irradiated onto the light receiving zone 91, the S-polarized −1-order light beams 67, 68 are irradiated onto the light receiving zone 92. Further, the 0-order light beam is polarized in a direction orthogonal to the direction of polarization of the ±1-order light beams, similar to the embodiment 7.

In the case of reproduction of a two layer disc, the return light beam 54 obtained from a 0-order light beam reflected upon the other layer is irradiated onto the surface of the optical detector, but it does not cause a tracking error signal to vary due to interference, similar to the embodiment 7.

Further, with this configuration, in the case of variation in wavelength of a semiconductor leaser beam, even though the diffraction angles of the ±1-order light beams to be diffracted at the polarizing grating 34 are changed so as to deviate the irradiated positions of the ±1-order light beams, a push-pull signal obtained from the light receiving zones 91, 92 is never affected thereby.

Embodiment 9

Figure 26:
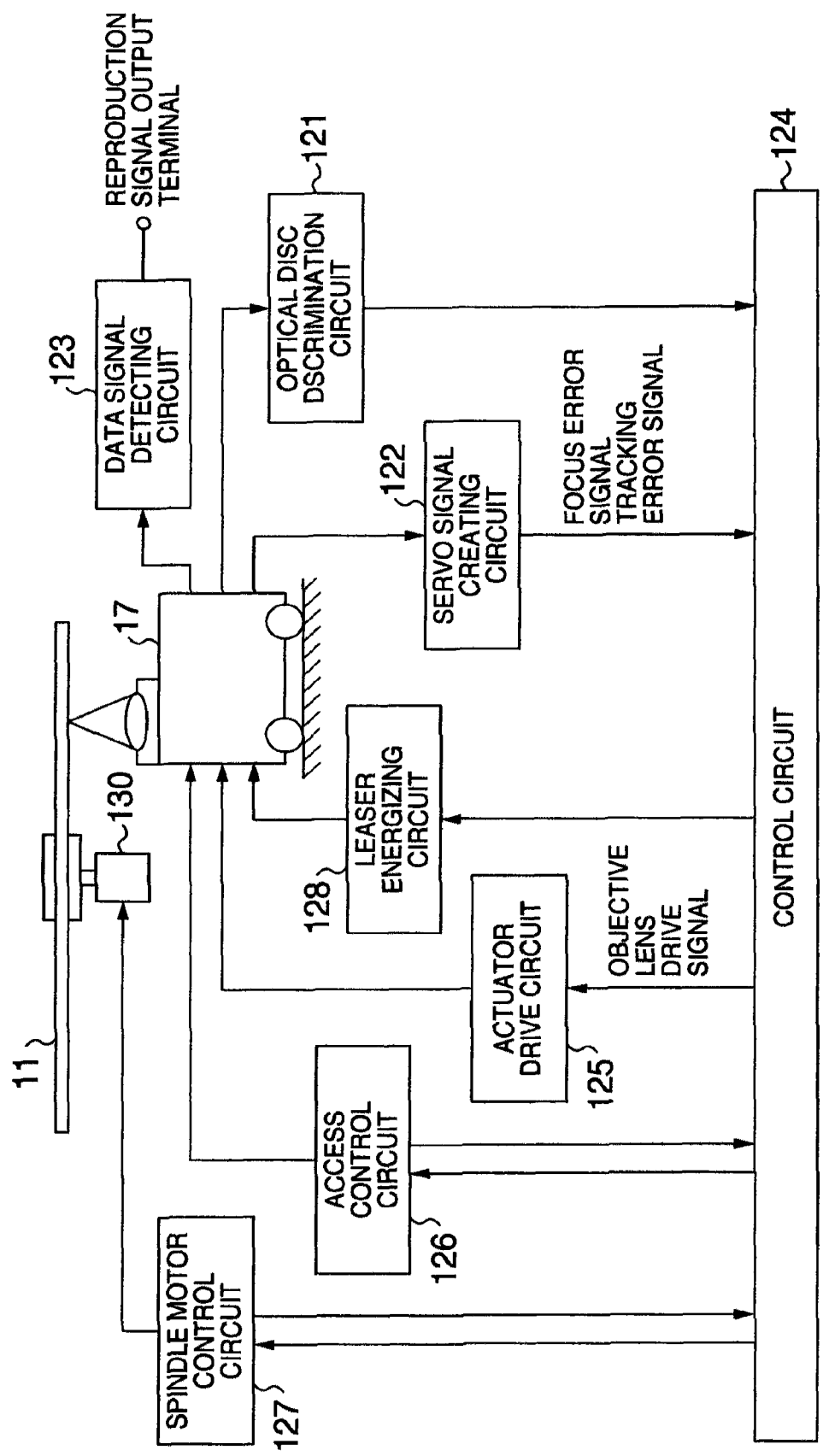
FIG. 26 is a schematic block diagram illustrating an optical disc unit mounted thereon with an optical pickup.

Next, explanation will be made of an optical disc apparatus which incorporates the optical pickup explained in any of the embodiments 1 to 8. Referring to FIG. 26 which is a schematic block diagram illustrating the optical disc apparatus which incorporates the optical pickup according to the present invention. A part of the signal detected by the optical pickup 17 is transmitted to an optical disc discrimination circuit 121 which is operated with the use such a fact that a focus error signal detected by the optical pickup 17 has a larger amplitude level in such a case that the substrate thickness of an optical disc corresponds to an oscillation frequency of an energized semiconductor laser, than in such a that it corresponds to a different oscillation frequency. The result of discrimination is delivered to a control circuit 124. Further, the other part of the detection signal detected by the optical pickup 17 is transmitted to a serve signal producing circuit 122 or a data signal detecting circuit 123. The servo signal producing circuit 122 produces, from various signals detected by the optical pickup 7, a focus error signal and a tracking error signal which are appropriate for an optical disc 11 or a two layer disc 22, and delivers the same to the control circuit 124. Meanwhile, the data signal detecting circuit 123 detects a data signal recorded on the optical disc 11 or the two layer disc 22 from signals detected by the optical pickup 17, and delivers the same to a reproduction signal output terminal. The control circuit 124 sets up the optical disc 11 or the two layer disc 22 in view of a signal from the optical disc discrimination signal 121, and delivers an objective lens drive signal to an actuator drive circuit 125, being based upon the focus error signal and the tracking error signal produced in the servo signal producing circuit 122, corresponding to the set-up disc. The actuator drive circuit 125 drives the actuator 8 in the optical pickup 17 in order to carry out positional control of the objective lens 7 in response to the objective lend drive signal. Further, the control circuit 124 carries out accesswise optional control of the optical pickup 17 through the intermediary of an access control circuit 126, and rotation control of a spindle motor 130 through the intermediary of a speed motor control circuit 126 in order to rotate the disc 11 or the two layer disc 22. Further, the control circuit 124 drives a laser energizing circuit 128 so as to selectively energize the semiconductor laser 1 incorporated in the optical pickup 17 in accordance with the optical disc 11 or the two layer disc 22 in order to carry out recording and reproduction in the optical disc apparatus.

It is noted that a reproduction unit for an optical disc can be composed of a data signal reproducing portion for reproducing a data signal from signals delivered from the optical pickup, and an output portion for outputting a signal delivered from the data signal reproducing portion. A recording unit for an optical disc can be composed of a data input portion for receiving a data signal, and a record signal producing portion for producing a signal to be recorded on an optical disc from the signal received from the data input portion, and delivering the same to the optical pickup.

As stated above, in view of the above-mentioned several embodiments, there is provided an optical pickup for outputting a focus error signal and a tracking error signal from three beams which are produced at a polarizing grating provided in a detection system, upon reproduction of a two layer disc, wherein the direction of polarization of a return light beam from a 0-order light beam reflected upon a layer other than a desired recording layer is set to be orthogonal to the direction of polarization of ±1-order signal light beam in order to eliminate affection by interference caused by the return light beam, thereby it is possible to prevent a focus error signal and a tracking error signal from varying. Thus, an optical pickup and an optical disc apparatus which are highly reliable can be materialized.

It is noted that the present invention should not be limited to the above-mentioned embodiments, that is, an S-polarized 0-order light beam and two P-polarized ±1-order light beams may be used instead of the P-polarized 0-order light beam and the two S-polarized ±1-order light beams.

Further, it goes without saying that two of a 0-order light beam and a +1-order light beams may be used so as to have a configuration, similar to the above-mentioned embodiments.

It should be further understood by those skilled in the art that although the foregoing description has been made of embodiments of the invention, the invention is not limited thereto and various changes and modifications may be made without departing from the spirit of the invention and the scope of the appended claims.

The invention claimed is:

1. An optical pickup configured to accept a multi-layer optical disc, comprising:
   a laser source for emitting an optical beam,
   an objective lens for focusing the light beam onto the multi-layer optical disc,
   a polarizing grating located at a position through which a reflected light beam from the multi-layer optical disc passes, for branching the reflected beam into at least two light beams comprising a 0-order light beam and a +1-order light beam having a direction of polarization which is orthogonal to that of the 0-order light beam,
   an optical detector for receiving the two light beams,
   a first light receiving zone which is provided in the optical detector, and onto which the 0-order light is irradiated, and,
   a second light receiving zone which is provided in the optical detector and onto which the +1-order light beam is irradiated,
   wherein the first light receiving zone has four zones, and the second light receiving zone has two zones, and a servo signal generation circuit configured to generate a push-pull signal by taking a difference between a sum signal of signals from two zones of the four zones and a sum signal of signals from the other two zones of the four zones, to generate an offset signal having substantially no push-pull signal components by taking a difference between a signal from one of the two zones of the second light receiving zone and a signal from another zone of the two zones of the second light receiving zone, to obtain a focus error signal by using signals from the first light receiving zone, and to obtain a tracking error signal by taking a difference between the push-pull signal and the offset signal.

2. An optical pickup configured to accept a multi-layer optical disc, comprising:
   a laser source for emitting an optical beam,
   an objective lens for focusing the light beam onto a multi-layer optical disc,
   a polarizing grating located at a position through which a reflected light beam from the multi-layer optical disc passes, for branching the reflected light beam into at least three light beams comprising a 0-order light beam, a +1-order light beam having a direction polarization orthogonal to that of the 0-order light beam, and a −1-order light beam having a direction of polarization orthogonal to that of the 0-order light beam,
   an optical detector for receiving the three light beams,
   a first light receiving zone which is located in the optical detector and onto which the 0-order light beam is irradiated,
   a second light receiving zone which is located in the optical detector, and onto which the +1-order light beam is irradiated,
   a third light receiving zone which is located in the optical detector and onto which the −1-order light beam is irradiated,
   wherein the first light receiving zone has four zones, and the second light receiving zone has two zones, and a servo signal generation circuit configured to generate a push-pull signal by taking a difference between a sum signal of signals from two zones of the four zones and a sum signal of signals from the other two zones of the four zones, to generate an offset signal having substantially no push-pull signal components by taking a difference between a signal from one of the two zones of the second light receiving zone and a signal from another zone of the two zones of the second light receiving, zone to obtain a focus error signal by using signals from the first light receiving zone, and to obtain a tracking error signal by taking a difference between the push-pull signal and the offset signal.

3. An optical pickup as set forth in claim 2, further including a diffraction element located at a position through which a reflected beam from the multi-layer disc passes, wherein a half-wave plate having a phase difference which is integer times as large as an about ½ of an oscillation wavelength of the semiconductor laser, is located at a position just before the diffraction element so as to turn the direction of polarization of the light beam by a predetermined angle in order to cause the light beam incident upon the diffraction element to have polarized components.

4. An optical pickup as set forth in claim 2, wherein the second or third light receiving zone detects a signal obtained from a substantially center part of the light beam which does not include a push-pull signal component of the +1-order light beam or the −1-order light beam, or parts in the vicinity of the outsides of the light beam, as viewed in the direction of tracks of an optical disc, which do not contain a push-pull component.

5. An optical pickup as set forth in claim 2, further including a diffraction element located at a position through which a reflected beam from the multi-layer disc passes, wherein the diffraction element diffracts the +1-order light beam or the −1-order light beam having the specific direction of polarization in a substantially center part of the light beam which does not include a push-pull signal component, parts in the vicinity of the outsides of the light beam, as viewed in the direction of tracks of an optical disc, which does not include a push-pull signal component, and the +1-order light beam or the −1-order light beam is detected by the second or third light receiving zone.

6. An optical pickup as set forth in claim 2, further including a diffraction element located at a position through which a reflected beam from the multi-layer disc passes, wherein the diffraction element is a polarizing grating having such a configuration that a part of the light beam which is diffracted by the diffraction element and which are not detected by the second or third light receiving zone is diffracted as a component having a specific direction of polarization, the direction of polarization thereof or a diffracted angle thereof is detected by the second or third light receiving zone.

7. An optical disc unit comprising:
   an optical pick-up capable of accepting a multi-layer optical disc,
   said optical pick-up comprising:
   a laser source for emitting an optical beam, an objective lens for focusing the light beam onto the multi-layer disc,
a polarizing branching element located at a position through which a reflected light beam from the multi-layer optical disc passes, for branching the reflected beam into at least two light beams, comprising a 0-order light beam and a +1-order light beam having a direction of polarization which is orthogonal to that of the 0-order light beam,
an optical detector for receiving the two light beams,
a first light receiving zone which is provided in the optical detector, and onto which the 0-order light is irradiated, and,
a second light receiving zone which is provided in the optical detector and onto which the +1-order light beam is irradiated,
wherein the first light receiving zone has four zones, and the second light receiving zone has two zones, and a servo signal generation circuit configured to generate a push-pull signal by taking a difference between a sum signal of signals from two zones of the four zones and a sum signal of signals from the other two zones of the four zones, to generate an offset signal having substantially no push-pull signal components by taking a difference between a signal from one of the two zones of the second light receiving zone and a signal from another zone of the two zones of the second light receiving zone, to obtain a focus error signal by using signals from the first light receiving zone, and to obtain a tracking error signal by taking a difference between the push-pull signal and the offset signal.

8. An optical disc unit comprising:
an optical pick-up configured to accept a multi-layer optical disc,
said optical pick-up comprising:
a laser source for emitting an optical beam,
an objective lens for focusing the light beam onto the multi-layer optical disc,
a diffraction element located at a position through which a reflected light beam from the multi-layer optical disc passes, for branching the reflected beam into at least two light beams comprising a 0-order light beam and a +1-order light beam having a direction of polarization which is orthogonal to that of the 0-order light beam,
a first light receiving zone which is provided in the optical detector, and onto which the 0-order light is irradiated, and,
a second light receiving zone which is provided in the optical detector and onto which the +1-order light beam is irradiated,
and a servo signal creating circuit for creating a focus error signal and a tracking error signal,
wherein the servo signal creating circuit is configured to obtain a push-pull signal from the first light receiving zone and an offset signal having substantially no push-pull signal component from the second light receiving zone, to create the tracking error signal by taking a difference between the push-pull signal and the offset signal, and to create the focus error signal from the first light receiving zone.

* * * * *